US010966181B2

(12) United States Patent
Gheorghiu et al.

(10) Patent No.: US 10,966,181 B2
(45) Date of Patent: Mar. 30, 2021

(54) DETERMINING SIGNAL DIRECTION AND INTERFERENCE USING MULTIPLE RECEIVE BEAMS

(71) Applicant: QUALCOMM Incorporated, San Diego, CA (US)

(72) Inventors: Valentin Alexandru Gheorghiu, Tokyo (JP); Raghu Narayan Challa, San Diego, CA (US); Tao Luo, San Diego, CA (US); Sumeeth Nagaraja, San Diego, CA (US); Ruhua He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/261,907

(22) Filed: Jan. 30, 2019

(65) Prior Publication Data
US 2019/0246301 A1 Aug. 8, 2019

Related U.S. Application Data

(60) Provisional application No. 62/625,510, filed on Feb. 2, 2018.

(51) Int. Cl.
*H04B 7/0408* (2017.01)
*H04B 7/06* (2006.01)
(Continued)

(52) U.S. Cl.
CPC .......... *H04W 72/02* (2013.01); *H04B 7/0408* (2013.01); *H04B 7/0617* (2013.01);
(Continued)

(58) Field of Classification Search
CPC ... H04B 7/02–216; H04B 17/0082–409; H04J 11/0023–0093;
(Continued)

(56) References Cited

U.S. PATENT DOCUMENTS

2013/0102345 A1* 4/2013 Jung .................... H04B 7/0456
2014/0334564 A1* 11/2014 Singh .................. H04B 7/0413
(Continued)

OTHER PUBLICATIONS

International Search Report and Written Opinion—PCT/US2019/016053—ISA/EPO—Jul. 8, 2019.
(Continued)

*Primary Examiner* — Timothy J Weidner
(74) *Attorney, Agent, or Firm* — Holland & Hart LLP

(57) ABSTRACT

Methods, systems, and devices for wireless communications are described. In some wireless communications systems, wireless devices (e.g., user equipment (UEs) and base stations) may communicate using beamformed transmissions. If a wireless device receives a transmission over multiple receive beams, the device may utilize signal measurements over the beams to determine a signal direction, a type of noise associated with the transmission, or both. The device may determine a signal direction based on received signal strength measurements over at least two receive beams and may select a beam for communication based on the determined signal direction. Additionally or alternatively, the device may compare noise measurements for the signal over at least two receive beams and may determine whether the noise corresponds to interference or white noise. The device may detect the direction of an interferer and may modify reception or demodulation based on the type of noise detected.

28 Claims, 16 Drawing Sheets

(51) Int. Cl.
  *H04B 7/08*    (2006.01)
  *H04B 17/00*   (2015.01)
  *H04B 17/318*  (2015.01)
  *H04B 17/345*  (2015.01)
  *H04W 16/28*   (2009.01)
  *H04W 24/02*   (2009.01)
  *H04W 24/08*   (2009.01)
  *H04W 72/02*   (2009.01)
  *H04W 72/04*   (2009.01)
  *H04W 72/08*   (2009.01)

(52) U.S. Cl.
  CPC ......... *H04B 7/088* (2013.01); *H04B 17/0082* (2013.01); *H04B 17/318* (2015.01); *H04B 17/345* (2015.01); *H04W 16/28* (2013.01); *H04W 24/02* (2013.01); *H04W 24/08* (2013.01); *H04W 72/046* (2013.01); *H04W 72/082* (2013.01); *H04W 72/085* (2013.01)

(58) Field of Classification Search
  CPC ...... H04J 2011/0003–0096; H04L 5/0001–26; H04W 4/70; H04W 8/18–30; H04W 16/28; H04W 24/02–10; H04W 28/02–0221; H04W 40/005–30; H04W 72/005–14; H04W 74/002–06
  See application file for complete search history.

(56) References Cited

U.S. PATENT DOCUMENTS

2016/0065284 A1   3/2016   Yu et al.
2017/0244451 A1*  8/2017   Raghavan ........... H04W 72/046
2020/0068576 A1*  2/2020   Li ..................... H04W 72/02

OTHER PUBLICATIONS

Partial International Search Report—PCT/US2019/016053—ISA/EPO—May 13, 2019.

* cited by examiner

DETERMINING SIGNAL DIRECTION AND INTERFERENCE USING MULTIPLE RECEIVE BEAMS

CROSS REFERENCES

The present application for patent claims the benefit of U.S. Provisional Patent Application No. 62/625,510 by GHEORGHIU et al., entitled "DETERMINING SIGNAL DIRECTION AND INTERFERENCE USING MULTIPLE RECEIVE BEAMS," filed Feb. 2, 2018, assigned to the assignee hereof, and expressly incorporated herein.

BACKGROUND

The present disclosure relates to wireless communications, and more specifically to determining signal direction and interference using multiple receive beams.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices (e.g., UEs and base stations) may communicate using beamformed transmissions. For example, base stations may transmit to UEs using one or more downlink transmit beams, and the UEs may receive the transmissions using downlink receive beams. In some cases, to determine a beam for transmission or reception, a wireless device may implement a beam refinement procedure. Beam refinement may involve iterating through a set of beams for transmission or reception in order to determine a "best" beam (e.g., a beam with the greatest receive signal strength, a beam with the most reliable throughput, etc.). In some cases, beam refinement may involve iterating through a set of wide beams, selecting a wide beam for transmission or reception, and further iterating through a set of narrow beams associated with the selected wide beam. While beam refinement may result in a reliable beam for communication, the iterative nature of the procedure may lead to a large amount of latency, redundancy, or signaling overhead.

SUMMARY

The described techniques relate to improved methods, systems, devices, or apparatuses that support determining signal direction and interference using multiple receive beams. Generally, the described techniques provide for a wireless communications system where wireless devices (e.g., user equipment (UEs) and base stations) may communicate using beamformed transmissions. If a wireless device receives a signal transmission over multiple receive beams, the device may utilize signal measurements over the beams to determine a signal direction, a type of noise associated with the transmission, or both. For example, the device may determine a signal direction based on received signal strength measurements over at least two receive beams (e.g., using lookup tables, functions, or equations in memory), and may select a beam for communication (i.e., a communication beam) based on the determined signal direction. Additionally or alternatively, the device may compare noise measurements for the signal over at least two receive beams, and may determine whether the noise corresponds to interference or white noise (e.g., based on a predetermined, semi-static, or dynamic noise level threshold). The device may modify reception or demodulation based on the type of noise detected. In some cases, the device may determine the direction of an interferer based on some combination of the above techniques.

A method for wireless communications is described. The method may include monitoring a channel for transmissions using a set of receive beams, receiving a signal using at least a first receive beam of the set of receive beams and a second receive beam of the set of receive beams, determining a direction of the signal based on a relationship between a first received signal strength for the signal corresponding to the first receive beam and a second received signal strength for the signal corresponding to the second receive beam, selecting, from a set of communication beams, a communication beam corresponding to the determined direction of the signal, where the set of communication beams is different from the set of receive beams used to monitor for transmissions, and utilizing the selected communication beam for communication.

An apparatus for wireless communications is described. The apparatus may include a processor, memory in electronic communication with the processor, and instructions stored in the memory. The instructions may be executable by the processor to cause the apparatus to monitor a channel for transmissions using a set of receive beams, receive a signal using at least a first receive beam of the set of receive beams and a second receive beam of the set of receive beams, determine a direction of the signal based on a relationship between a first received signal strength for the signal corresponding to the first receive beam and a second received signal strength for the signal corresponding to the second receive beam, select, from a set of communication beams, a communication beam corresponding to the determined direction of the signal, where the set of communication beams is different from the set of receive beams used to monitor for transmissions, and utilize the selected communication beam for communication.

Another apparatus for wireless communications is described. The apparatus may include means for monitoring a channel for transmissions using a set of receive beams, receiving a signal using at least a first receive beam of the set of receive beams and a second receive beam of the set of receive beams, determining a direction of the signal based on a relationship between a first received signal strength for the signal corresponding to the first receive beam and a second received signal strength for the signal corresponding to the second receive beam, selecting, from a set of communication beams, a communication beam corresponding to the determined direction of the signal, where the set of communication beams is different from the set of receive beams used to monitor for transmissions, and utilizing the selected communication beam for communication.

A non-transitory computer-readable medium storing code for wireless communications is described. The code may include instructions executable by a processor to monitor a channel for transmissions using a set of receive beams, receive a signal using at least a first receive beam of the set of receive beams and a second receive beam of the set of receive beams, determine a direction of the signal based on a relationship between a first received signal strength for the signal corresponding to the first receive beam and a second received signal strength for the signal corresponding to the second receive beam, select, from a set of communication beams, a communication beam corresponding to the determined direction of the signal, where the set of communication beams is different from the set of receive beams used to monitor for transmissions, and utilize the selected communication beam for communication.

In some examples of the method, apparatuses, and non-transitory computer-readable medium described herein, the relationship between the first received signal strength and the second received signal strength is a difference between the first received signal strength and the second received signal strength. Some examples of the method, apparatuses, and non-transitory computer-readable medium described herein may further include operations, features, means, or instructions for calculating the difference between the first received signal strength and the second received signal strength, where the direction of the signal may be determined based on the difference in between the first received signal strength and the second received signal strength.

In some examples of the method, apparatuses, and non-transitory computer-readable medium described herein, determining the direction of the signal may include operations, features, means, or instructions for accessing a lookup table in memory, where the lookup table includes indications of differences in received signal strengths and corresponding signal directions.

In some examples of the method, apparatuses, and non-transitory computer-readable medium described herein, determining the direction of the signal may include operations, features, means, or instructions for inputting the difference between the first received signal strength and the second received signal strength into a function and obtaining the direction of the signal as an output of the function.

Some examples of the method, apparatuses, and non-transitory computer-readable medium described herein may further include operations, features, means, or instructions for identifying a first antenna gain corresponding to the first received signal strength for the signal corresponding to the first receive beam and a second antenna gain corresponding to the second received signal strength for the signal corresponding to the second receive beam, where the direction of the signal may be determined based on the identified first antenna gain and the identified second antenna gain.

In some examples of the method, apparatuses, and non-transitory computer-readable medium described herein, determining the direction of the signal may include operations, features, means, or instructions for accessing one or more lookup tables in memory, where the one or more lookup tables include indications of different antenna gains and corresponding signal directions.

In some examples of the method, apparatuses, and non-transitory computer-readable medium described herein, determining the direction of the signal may include operations, features, means, or instructions for inputting the identified first antenna gain and the identified second antenna gain into a function and obtaining the direction of the signal as an output of the function.

Some examples of the method, apparatuses, and non-transitory computer-readable medium described herein may further include operations, features, means, or instructions for estimating an antenna gain for at least one communication beam of the set of communication beams different from each of the set of receive beams based on the determined direction of the signal.

Some examples of the method, apparatuses, and non-transitory computer-readable medium described herein may further include operations, features, means, or instructions for determining an estimated received signal strength for the selected communication beam corresponding to the determined direction of the signal.

Some examples of the method, apparatuses, and non-transitory computer-readable medium described herein may further include operations, features, means, or instructions for receiving, in different directions, one or more additional signals over one or more receive beams of the set of receive beams and estimating additional received signal strengths for the one or more additional signals received in the different directions, where selecting the communication beam may be further based on the estimated additional received signal strengths.

Some examples of the method, apparatuses, and non-transitory computer-readable medium described herein may further include operations, features, means, or instructions for identifying noise associated with the signal and comparing a first noise level of the identified noise for the first receive beam to a second noise level of the identified noise for the second receive beam, where selecting the communication beam may be further based on the comparing.

Some examples of the method, apparatuses, and non-transitory computer-readable medium described herein may further include operations, features, means, or instructions for modifying a reception or demodulation process based on the comparing, where the communication further utilizes the modified reception or demodulation process.

Some examples of the method, apparatuses, and non-transitory computer-readable medium described herein may further include operations, features, means, or instructions for determining whether the identified noise corresponds to interference or spatially white noise, where modifying the reception or demodulation process may be further based on the determining.

In some examples of the method, apparatuses, and non-transitory computer-readable medium described herein, modifying the reception or demodulation process may include operations, features, means, or instructions for mapping a first signal quality from the first receive beam to a first demodulation metric and a second signal quality from the second receive beam to a second demodulation metric based on the comparing.

Some examples of the method, apparatuses, and non-transitory computer-readable medium described herein may further include operations, features, means, or instructions for detecting an interference source based on the comparing and determining a direction of the interference source based on the first noise level of the identified noise, the second noise level of the identified noise, or a combination thereof.

In some examples of the method, apparatuses, and non-transitory computer-readable medium described herein, the communication beam is selected based on the determined direction of the interference source.

In some examples of the method, apparatuses, and non-transitory computer-readable medium described herein, the number of receive beams includes a subset of the set of communication beams. In some examples of the method, apparatuses, and non-transitory computer-readable medium described herein, the selected communication beam is different from each of the number of receive beams.

In some examples of the method, apparatuses, and non-transitory computer-readable medium described herein, selecting the communication beam further may include operations, features, means, or instructions for determining an index of the selected communication beam, a beam direction of the selected communication beam, a width of the selected communication beam, one or more antenna elements for the selected communication beam, or a combination thereof.

Some examples of the method, apparatuses, and non-transitory computer-readable medium described herein may further include operations, features, means, or instructions for selecting the communication beam based on maximizing an estimated antenna gain for the selected communication beam.

In some examples of the method, apparatuses, and non-transitory computer-readable medium described herein, at least one of the number of receive beams is wider than the selected communication beam.

A method of wireless communications is described. The method may include monitoring for transmissions using a number of receive beams, receiving a signal over at least two beams of the number of receive beams, determining a direction based on received signal strengths of the signal for the at least two beams, selecting a beam corresponding to the determined direction, and utilizing the selected beam for communication.

An apparatus for wireless communications is described. The apparatus may include means for monitoring for transmissions using a number of receive beams, means for receiving a signal over at least two beams of the number of receive beams, means for determining a direction based on received signal strengths of the signal for the at least two beams, means for selecting a beam corresponding to the determined direction, and means for utilizing the selected beam for communication.

Another apparatus for wireless communications is described. The apparatus may include a processor, memory in electronic communication with the processor, and instructions stored in the memory. The instructions may be operable to cause the processor to monitor for transmissions using a number of receive beams, receive a signal over at least two beams of the number of receive beams, determine a direction based on received signal strengths of the signal for the at least two beams, select a beam corresponding to the determined direction, and utilize the selected beam for communication.

A non-transitory computer-readable medium for wireless communications is described. The non-transitory computer-readable medium may include instructions operable to cause a processor to monitor for transmissions using a number of receive beams, receive a signal over at least two beams of the number of receive beams, determine a direction based on received signal strengths of the signal for the at least two beams, select a beam corresponding to the determined direction, and utilize the selected beam for communication.

In some examples of the method, apparatus, and non-transitory computer-readable medium described herein, utilizing the selected beam for communication includes monitoring for additional transmissions using the selected beam, where the selected beam contains a receive beam. Some examples of the method, apparatus, and non-transitory computer-readable medium described herein may further include processes, features, means, or instructions for receiving one or more additional signals over the selected beam.

In other examples of the method, apparatus, and non-transitory computer-readable medium described herein, utilizing the selected beam for communication includes transmitting one or more signals using the selected beam, where the selected beam contains a transmit beam.

In some examples of the method, apparatus, and non-transitory computer-readable medium described herein, the determined direction may be a signal direction of the signal.

Some examples of the method, apparatus, and non-transitory computer-readable medium described herein may further include processes, features, means, or instructions for calculating a difference in the received signal strengths of the signal for the at least two beams, where the signal direction may be determined based on the difference in the received signal strengths. In some examples of the method, apparatus, and non-transitory computer-readable medium described herein, determining the signal direction includes accessing a lookup table in memory, where the lookup table contains indications of differences in received signal strengths and corresponding signal directions. In other examples of the method, apparatus, and non-transitory computer-readable medium described herein, determining the signal direction includes inputting the difference in the received signal strengths into a function. Some examples of the method, apparatus, and non-transitory computer-readable medium described herein may further include processes, features, means, or instructions for obtaining the signal direction as an output of the function.

Some examples of the method, apparatus, and non-transitory computer-readable medium described herein may further include processes, features, means, or instructions for identifying antenna gains corresponding to the received signal strengths of the signal for the at least two beams, where the signal direction may be determined based on the identified antenna gains. In some examples of the method, apparatus, and non-transitory computer-readable medium described herein, determining the signal direction includes accessing one or more lookup tables in memory, where the one or more lookup tables contain indications of different antenna gains and corresponding signal directions. In other examples of the method, apparatus, and non-transitory computer-readable medium described herein, determining the signal direction includes inputting the identified antenna gains into a function. Some examples of the method, apparatus, and non-transitory computer-readable medium described herein may further include processes, features, means, or instructions for obtaining the signal direction as an output of the function.

Some examples of the method, apparatus, and non-transitory computer-readable medium described herein may further include processes, features, means, or instructions for estimating an antenna gain for an inactive beam that may be not included in the number of receive beams based on the determined signal direction.

Some examples of the method, apparatus, and non-transitory computer-readable medium described herein may further include processes, features, means, or instructions for determining an estimated received signal strength for the beam corresponding to the determined direction.

Some examples of the method, apparatus, and non-transitory computer-readable medium described herein may further include processes, features, means, or instructions for receiving, in different directions, one or more additional signals over one or more beams of the number of receive beams. Some examples of the method, apparatus, and non-transitory computer-readable medium described herein may further include processes, features, means, or instructions for estimating additional received signal strengths for the one or more additional signals received in the different directions, where selecting the beam may be based on the estimated additional received signal strengths.

In some examples of the method, apparatus, and non-transitory computer-readable medium described herein, the number of receive beams contain a subset of a total set of configurable beams. In some examples of the method, apparatus, and non-transitory computer-readable medium described herein, the selected beam for communication may not be included in the number of receive beams.

In some examples of the method, apparatus, and non-transitory computer-readable medium described herein, selecting the beam includes determining an index of the beam, a beam direction of the beam, a width of the beam, one or more antenna elements for the beam, or a combination thereof.

In some examples of the method, apparatus, and non-transitory computer-readable medium described herein, selecting the beam may be further based on maximizing an estimated antenna gain for the beam. In some examples of the method, apparatus, and non-transitory computer-readable medium described herein, the number of receive beams include wider beams than the selected beam for communication.

A further method of wireless communications is described. The method may include monitoring for transmissions using a number of receive beams, receiving a signal over at least two beams of the number of receive beams, identifying noise associated with the signal received over the at least two beams, comparing noise level measurements of the identified noise for the at least two beams, and modifying a reception or demodulation process based on the comparing.

An apparatus for wireless communications is described. The apparatus may include means for monitoring for transmissions using a number of receive beams, means for receiving a signal over at least two beams of the number of receive beams, means for identifying noise associated with the signal received over the at least two beams, means for comparing noise level measurements of the identified noise for the at least two beams, and means for modifying a reception or demodulation process based on the comparing.

Another apparatus for wireless communications is described. The apparatus may include a processor, memory in electronic communication with the processor, and instructions stored in the memory. The instructions may be operable to cause the processor to monitor for transmissions using a number of receive beams, receive a signal over at least two beams of the number of receive beams, identify noise associated with the signal received over the at least two beams, compare noise level measurements of the identified noise for the at least two beams, and modify a reception or demodulation process based on the comparing.

A non-transitory computer-readable medium for wireless communications is described. The non-transitory computer-readable medium may include instructions operable to cause a processor to monitor for transmissions using a number of receive beams, receive a signal over at least two beams of the number of receive beams, identify noise associated with the signal received over the at least two beams, compare noise level measurements of the identified noise for the at least two beams, and modify a reception or demodulation process based on the comparing.

Some examples of the method, apparatus, and non-transitory computer-readable medium described herein may further include processes, features, means, or instructions for determining whether the identified noise corresponds to interference or spatially white noise, where modifying the reception or demodulation process may be further based on the determining.

In some examples of the method, apparatus, and non-transitory computer-readable medium described herein, comparing the noise level measurements includes determining whether the noise level measurements differ by less than a threshold amount. Some examples of the method, apparatus, and non-transitory computer-readable medium described herein may further include processes, features, means, or instructions for determining that the identified noise corresponds to spatially white noise if the noise level measurements differ by less than the threshold amount. Other examples of the method, apparatus, and non-transitory computer-readable medium described herein may further include processes, features, means, or instructions for determining that the identified noise corresponds to interference if the noise level measurements differ by more than the threshold amount.

In some examples of the method, apparatus, and non-transitory computer-readable medium described herein, modifying the reception or demodulation process includes calculating noise variance and interference variance for signal demodulation based on the determining.

Some examples of the method, apparatus, and non-transitory computer-readable medium described herein may further include processes, features, means, or instructions for detecting an interference source based on the comparing. Some examples of the method, apparatus, and non-transitory computer-readable medium described herein may further include processes, features, means, or instructions for determining a direction of the interference source based on received signal strengths of the signal for the at least two beams. Some examples of the method, apparatus, and non-transitory computer-readable medium described herein may further include processes, features, means, or instructions for selecting a beam direction for communication, where the selected beam direction may be based on the determined direction of the interference source.

Some examples of the method, apparatus, and non-transitory computer-readable medium described herein may further include processes, features, means, or instructions for monitoring a radio link. Some examples of the method, apparatus, and non-transitory computer-readable medium described herein may further include processes, features, means, or instructions for determining failure of the radio link based on the comparing.

In some examples of the method, apparatus, and non-transitory computer-readable medium described herein, modifying the reception or demodulation process includes mapping signal qualities from the at least two beams to demodulation metrics based on the comparing. In some examples of the method, apparatus, and non-transitory computer-readable medium described herein, modifying the reception or demodulation process includes selecting a beam for reception based on the comparing.

DETAILED DESCRIPTION

Figure 1:
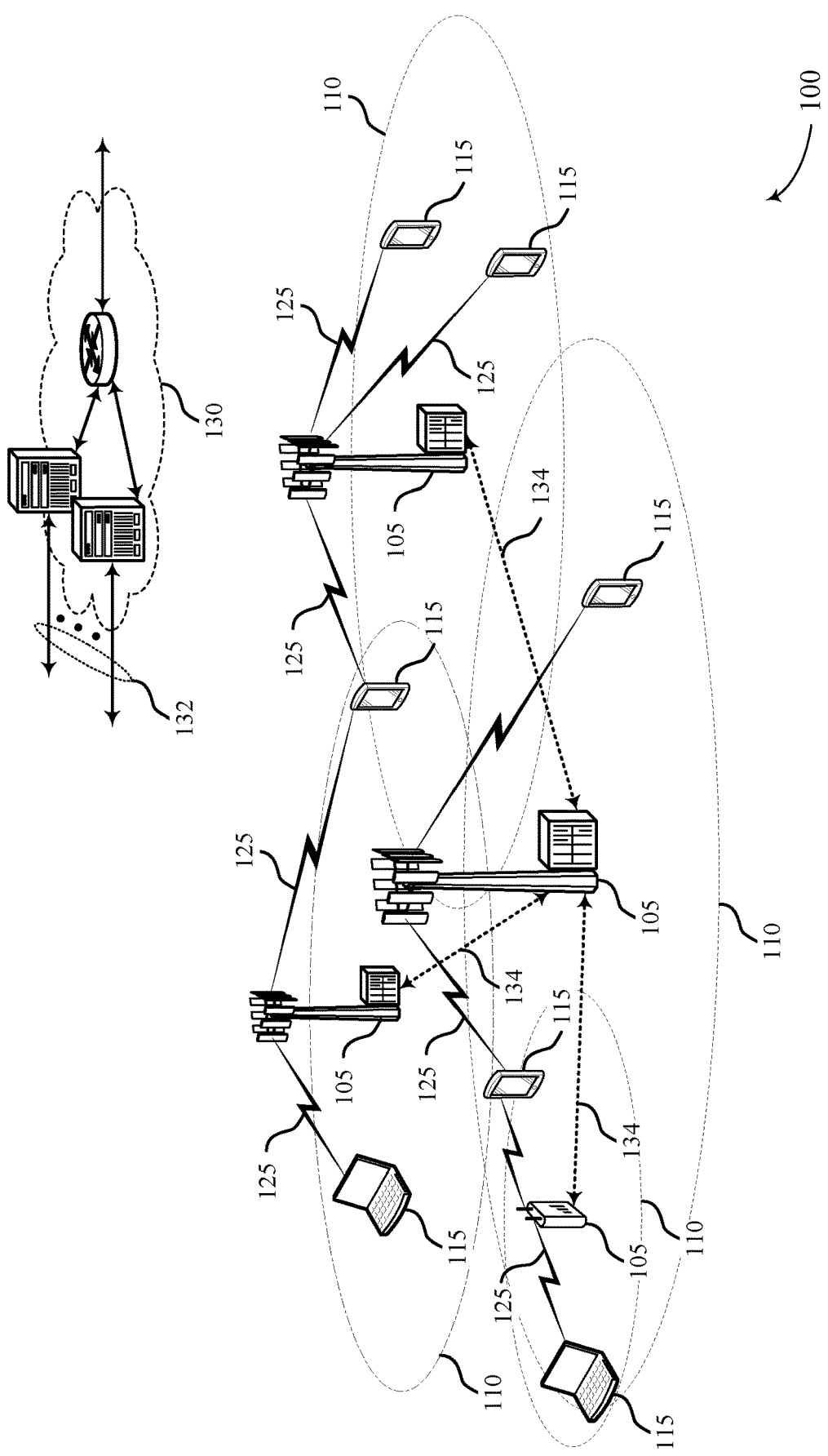
FIG. 1 illustrates an example of a system for wireless communications that supports determining signal direction and interference using multiple receive beams in accordance with aspects of the present disclosure.

In some wireless communications systems (e.g., millimeter wave (mmW) systems), wireless devices may utilize active antennas and beamforming for communications. For example, base stations may transmit signals using downlink transmit beams, and user equipments (UEs) may receive the signals using downlink receive beams. Similarly, UEs may transmit signals using uplink transmit beams, and base stations may receive the signals using uplink receive beams. These beams may be defined by a number of beam characteristics, including beam direction, beam width, beam index, operating antenna, or some combination of these or other parameters. Wireless devices may utilize multiple receive beams when monitoring for transmissions over a channel.

In some cases, a wireless device (e.g., a UE or base station) may receive a signal over multiple receive beams (e.g., from a base station or UE). The wireless device may determine measurements, such as received signal strength measurements, for at least two receive beams. The device may use these measurements to determine a direction of the received signal, a type of noise associated with the signal, or a combination of these. For example, in some cases, the device may use the received signal strength measurements—or corresponding gains—to determine the signal direction. The device may store in memory lookup tables, equations, or formulas associated with certain beams, where the tables, equations, or formulas may indicate signal directions corresponding to predetermined measured signal strengths or gains. The device may use the measurements and these indications in memory to determine a direction that the signal was received. The device may select a beam for communication (i.e., a communication beam) according to the determined signal direction, where the beam direction for the selected communication beam may correspond to the determined signal direction. In some examples, the device may select the communication beam from a set of communication beams that is different than the multiple receive beams used to receive the signal. For example, at least one beam (a communication beam) of the set of communication beams may be different from at least one beam (a receive beam) of the multiple receive beams. In some cases, the set of communication beams may be a subset of the set of receive beams. In other cases, the set of receive beams may be a subset of the set of communication beams. In yet other cases, the set of receive beams and the communication beams may share a common subset of one or more beams, and at least one beam is unique to the set of communication beams and/or at least one beam is unique to the set of receive beams. In other examples, the device may select the communication beam from a set of communication beams that is the same as the multiple receive beams used to receive the signal.

Additionally or alternatively, the wireless device may identify noise received with the signal. The device may compare the levels of noise received with the signal for different receive beams. If the difference in noise between different receive beams is below a predetermined noise level threshold, the device may determine that the noise corresponds to white noise. However, if the difference in noise between different receive beams is equal to or above the predetermined noise level threshold, the device may determine that the noise corresponds to interference and may determine the direction of the interferer based on comparing the noise levels between the receive beams. The device may modify communication or demodulation procedures based on the type of noise detected. In some examples, a wireless device may implement both signal direction and interference identification based on receiving a signal over multiple beams.

Aspects of the disclosure are initially described in the context of wireless communications systems. Additional aspects of the disclosure are described with reference to exemplary processes and process flows for determining a signal direction, a type of noise, or both using multiple receive beams. Aspects of the disclosure are further illustrated by and described with reference to apparatus diagrams, system diagrams, and flowcharts that relate to determining signal direction and interference using multiple receive beams.

FIG. 1 illustrates an example of a wireless communications system 100 that supports determining signal direction and interference using multiple receive beams in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a number of antenna elements of an antenna array, or by processing received signals according to different receive beamforming weight sets applied to signals received at a number of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100 (e.g., mmW systems), wireless devices may utilize beamforming for communications. For example, base stations 105 may transmit signals using downlink transmit beams, and UEs 115 may receive the signals using downlink receive beams. Similarly, UEs 115 may transmit signals using uplink transmit beams, and base stations 105 may receive the signals using uplink receive beams. These beams may be defined by a number of beam characteristics, including beam direction, beam width, beam index, or some combination of these or other parameters. Wireless devices may utilize multiple receive beams when monitoring for transmissions over a channel (e.g., in order to monitor in different directions).

In some cases, a wireless device (e.g., a UE 115) may receive a signal over multiple receive beams (e.g., from a base station 105 or another UE 115). The UE 115 may determine measurements, such as received signal strength measurements, for at least two receive beams. The UE 115 may use these measurements to determine a direction of the received signal, a type of noise associated with the signal, or a combination of these. For example, in some cases, the UE 115 may use the received signal strength measurements—or corresponding gains—to determine the signal direction. The UE 115 may store lookup tables, equations, or formulas in memory, where the tables, equations, or formulas may indicate signal directions corresponding to measured signal strengths or gains for specific beams or beam combinations. The UE 115 may use the measurements and these indications in memory to determine a direction that the signal was received. The UE 115 may select a beam for communication (e.g., uplink, downlink, or both) according to the determined signal direction.

In other cases, the UE 115 may identify noise received with the signal. The UE 115 may compare the level of noise received at different receive beams for the signal. If the difference in noise between different receive beams is below a predetermined noise level threshold, the UE 115 may determine that the noise corresponds to white noise. However, if the difference in noise between different receive beams is equal to or above the noise level threshold, the UE 115 may determine that the noise corresponds to interference, and may determine the location or direction of the interferer. The UE 115 may modify communication or demodulation procedures based on the type of noise detected. In some examples, the UE 115 may implement both signal direction and interference identification based on receiving the signal over multiple beams.

Figure 2:
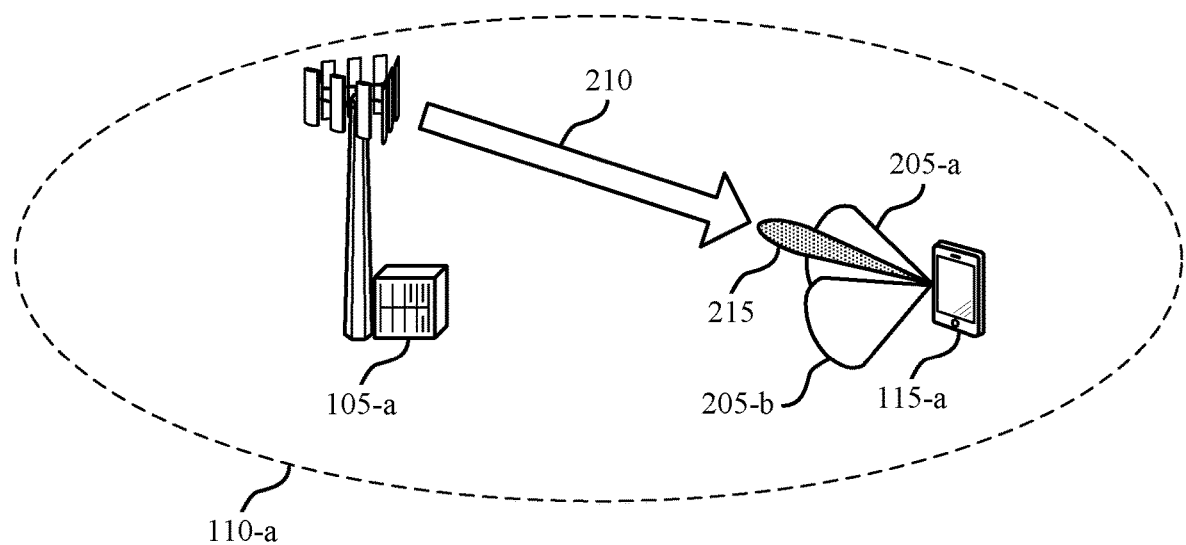
FIGS. 2 and 3 illustrate examples of wireless communications systems that support determining signal direction and interference using multiple receive beams in accordance with aspects of the present disclosure.

FIG. 2 illustrates an example of a wireless communications system 200 that supports determining signal direction and interference using multiple receive beams in accordance with various aspects of the present disclosure. The wireless communications system 200 may include base station 105-a and UE 115-a, which may be examples of a base station 105 and a UE 115, as described with reference to FIG. 1. Base station 105-a may provide network coverage for geographic area 110-a. Base station 105-a and UE 115-a may communicate using beamformed or directional transmissions (e.g., for both uplink and downlink transmissions). As illustrated, UE 115-a may monitor a channel utilizing multiple receive beams 205 (e.g., downlink receive beams). UE 115-a may receive a signal 210 from base station 105-a over at least two receive beams 205, and may determine a direction (e.g., of the received signal 210, for a beam 215, etc.) based on received signal strengths at the receive beams 205.

In some wireless communications systems 200 (e.g., mmW systems), wireless devices may utilize active antennas and beamforming to improve the overall link budget in the system. For example, base station 105-a may transmit one or more signals 210 to UE 115-a using one or more downlink transmit beams, and UE 115-a may receive the signals 210 using one or more downlink receive beams 205. Different beam characteristics may affect the gains and losses involved in transmitting and receiving a signal 210. For example, the antenna elements used for the beamforming, the width of the beam, the direction of the beam, or any combination of these beam characteristics may affect the gains and losses, and, correspondingly, the overall link budget. Accordingly, UE 115-a and base station 105-a may select beams or beam parameters for transmission or reception based on optimizing an estimated link budget.

Some wireless devices (e.g., mmW devices, such as base station 105-a and UE 115-a) may generate different beam patterns, different directions for one or more beams, or some combination of these. For example, UE 115-a may utilize two receive beams 205 for downlink signal reception. These receive beams 205-a and 205-b may correspond to different beam directions. In some cases, UE 115-a may monitor the channel with multiple receive beams 205 (e.g., associated with same or different antenna elements of UE 115-a) at a same time in order to successfully receive signals 210 from different directions.

In some cases, wireless devices may implement different beam widths depending on the functionality of the beams. For example, UE 115-a may implement wider beams 205 (e.g., with corresponding lower gains) to simultaneously monitor for signals coming from different directions, and may implement narrower beams 215 (e.g., with corresponding higher gains) when transmitting data, or when monitoring for signals in a specific direction. However, in order to select a narrower beam 215 that improves throughput for communications, UE 115-a may need to determine an accurate beam direction for the narrower beam 215. For example, for UE 115-a to transmit signals to or receive signals from base station 105-a using narrower beam 215, UE 115-a may first determine the beam direction between UE 115-a and base station 105-a. This beam direction may correspond to the signal direction associated with receiving the signal 210 from base station 105-a.

To determine a signal direction, a wireless device may measure the strength of an incoming signal across multiple receive beams. For example, base station 105-a may transmit signal 210 to UE 115-a. UE 115-a may monitor for signals using multiple downlink receive beams 205 (e.g., downlink receive beams 205-a and 205-b), and may receive the signal 210 on both of these downlink receive beams 205. In some cases, UE 115-a may monitor the channel with more than two downlink receive beams 205, and may receive the signal 210 on some subset of these beams. If UE 115-a receives the signal 210 on at least two downlink receive beams 205, UE 115-a may measure the signal 210 on these beams 205. For example, UE 115-a may measure the received signal strength for signal 210 on downlink receive beam 205-a and on downlink receive beam 205-b. UE 115-a may determine the direction that signal 210 is received at based on these measured received signal strengths.

For example, UE 115-a may calculate a difference between the received signal strength over beam 205-a and the received signal strength over beam 205-b for signal 210. This difference in received signal strengths may correspond to a difference in gains between the two beams 205 (e.g., where the gains depend on the section of the beam 205 that the signal is initially received at). UE 115-a may determine a direction of the signal 210 based on the antenna gains, the difference between the received signal strengths, the difference in antenna gains, or any combination of these. For example, in some cases, UE 115-a may store one or more lookup tables in memory. The lookup tables may include indications of beam-specific antenna gains and corresponding signal directions, indications of differences in antenna gains and corresponding signal directions (e.g., for specific beam pairs), indications of differences in received signal strengths and corresponding signal directions (e.g., for specific beam pairs), or any combination of these or other tables to convert signal measurements into corresponding signal directions. Alternatively, UE 115-a may implement functions or equations (e.g., as opposed to lookup tables) to determine a corresponding signal direction based on received signal strengths or antenna gains. The functions, equations, or values in the lookup tables may be based on empirical data, simulations, estimations, or any other procedure for determining accurate signal directions. In some cases, the functions, equations, or lookup tables may be device-specific.

In some examples, UE 115-a may receive signal 210 over more than two downlink receive beams 205. In some cases, UE 115-a may select two of the downlink receive beams 205 (e.g., the downlink receive beams 205 that received the signal 210 with the highest power), and may determine the signal direction based on the measurements from the selected beams. In other cases, UE 115-a may determine signal directions for multiple pairs of downlink receive beams 205 separately, and may combine the results (e.g., averaging the resulting signal directions) to obtain a signal direction. In yet other cases, UE 115-a may include lookup tables, functions, or equations in memory that are based on measurements from more than two downlink receive beams 205 and may determine the signal direction based on these tables, functions, or equations. In other examples, UE 115-a may receive signal 210 over a single downlink receive beam 205, and may determine to communicate with base station 105-b using the single beam without performing the signal direction determination processes.

In yet other examples, UE 115-a may receive multiple signals 210 in different directions (e.g., using receive beams 205). In some cases, UE 115-a may receive signal 210 in different directions based on different propagation paths of the signal 210 (e.g., due to reflection of the signal). In other cases, UE 115-a may receive signals from multiple base stations 105 or UEs 115. For example, UE 115-a may receive signal 210 from base station 105-a and may additionally receive a second signal from a second base station 105. UE 115-a may receive any number of signals from any number of devices in this manner, and may determine a direction based on these received signals. For example, UE 115-a may estimate received signal strengths for each of the received signals, and may compare the estimated signal strengths. UE 115-a may select a beam for communication (e.g., a receive beam) in the beam direction corresponding to the greatest received signal strength of the estimated signal strengths.

In any of the above cases or examples, UE 115-a may select a beam 215 for communication (i.e., a communication beam) with base station 105-a based on the determined signal direction. Alternatively, UE 115-a may determine a direction for beam 215 independent of the signal direction. For example, UE 115-a may determine estimated gains (e.g., antenna gains) for beams in different directions based on the received signal 210 measurements, and may select a beam 215 for communication based on the estimated gains. UE 115-a may select the beam 215 with the greatest estimated gain for transmission to or reception from base station 105-a.

In an exemplary procedure, as illustrated in FIG. 2, UE 115-a may monitor a channel using downlink receive beams 205-a and 205-b, and may receive a signal 210 from base station 105-a over both of these beams 205. UE 115-a may determine a received signal strength for the signal 210 over downlink receive beam 205-a and over downlink receive beam 205-b, and may calculate the difference between these two strengths (e.g., in decibels (dBs)). UE 115-a may access a lookup table in memory corresponding to the relationship between downlink receive beams 205-a and 205-b, and may determine the signal direction corresponding to the difference in received signal strengths. This signal direction may correspond to the direction between UE 115-a and base station 105-a (e.g., between the receive antenna array at UE 115-a receiving signal 210, and the transmit antenna array at base station 105-a transmitting signal 210).

UE 115-a may select a communication beam 215 to utilize for communication with base station 105-a based on the determined signal direction. This communication beam 215 beam may be selected from a set of communication beams that is different than the set of downlink receive beams monitoring for the signal 210. In some examples, one or more of the set(s) of communication beams may be the same as one or more of the set(s) of downlink receive beams. The sets overall may include one or more different communication beams. For example, the set of communication beams may be a subset of the set of downlink receive beams. Alternatively, the set of downlink receive beams may be a subset of the set of communication beams. In other cases, the set of communication beams and the set of downlink receive beams may share a common set of one or more beams, while the other members of one set of beams are different from the other set of beams. In some cases, communication beam 215 beam may be selected from the set of downlink receive beams, for example where the downlink set of receive beams monitoring for the signal 210 is the same as the set of communication beams. UE 115-a may select a beam 215 with a beam direction corresponding to the received signal direction. For example, if UE 115-a received signal 210 in a given direction, UE 115-a may operate a downlink receive beam 215 to monitor for additional signals received from the same direction (e.g., within a threshold number of degrees), or may operate an uplink transmit beam 215 to transmit signals to base station 105-a in the opposite direction (e.g., similarly within a threshold number of degrees). In some cases, a communication beam 215 may perform either or both of these functions. Additionally or alternatively, UE 115-a may determine a beam index for beam 215, a width of the beam 215, an antenna element or antenna array for the beam 215, or any combination of these or other beam characteristics based on the determined signal direction or other signal 210 measurements. UE 115-a may select the beam 215 for communication based on maximizing an estimated antenna gain (e.g., in uplink or downlink) for communications between base station 105-a and UE 115-a. For example, based on determining the signal 210 direction—and, correspondingly, the direction of base station 105-a—UE 115-a may communicate with base station 105-a using a narrower communication beam 215 than downlink receive beams 205. UE 115-a may use downlink receive beams 205 to initially connect with or detect devices for communication and may use narrower beams in a specific direction for communications with previously detected devices.

In some cases, the wireless communications system 200 may implement signal direction determination to avoid performing a beam refinement process. For example, the beam refinement process may involve a wireless device (e.g., UE 115-a or base station 105-a) attempting a number of transmission or reception processes using multiple beams (e.g., in a beam sweeping procedure). In some cases, the wireless device may iterate through a large number of potential beams (e.g., all potential beams) in order to determine the beam for communication corresponding to the highest gain. By implementing signal direction determination and selecting a beam 215 based on the determined signal direction, UE 115-a—or a similar wireless device—may reduce the latency and redundancy associated with selecting a beam based on beam refinement.

As described herein, the wireless communications system 200 illustrates a UE 115 determining a signal direction for a signal 210 received on the downlink from a base station 105. However, a base station 105 or a UE 115 implementing device-to-device (D2D) communications may perform a similar operation. For example, a base station 105 may receive a signal on the uplink from a UE 115, and may determine the signal direction based on receiving the signal using multiple uplink receive beams. Alternatively, a UE 115 may receive a signal from another UE 115 (e.g., in D2D communications), and may determine the signal direction using multiple receive beams. Such a base station 105 or D2D device may perform any combination of the processes described herein with reference to UE 115-a.

Figure 3:
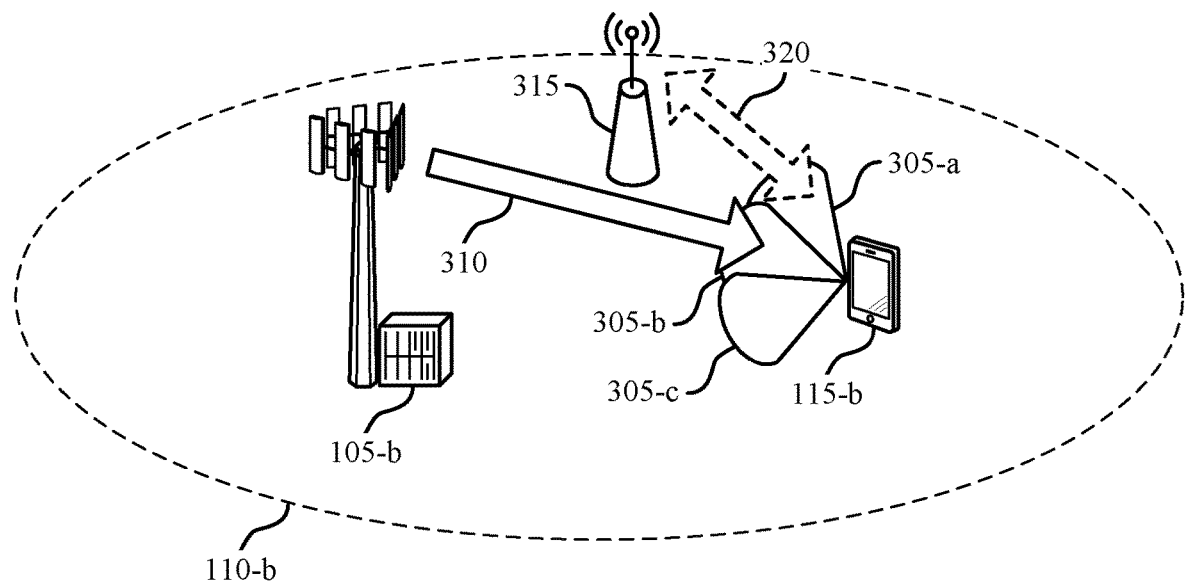

FIG. 3 illustrates an example of a wireless communications system 300 that supports determining signal direction and interference using multiple receive beams in accordance with various aspects of the present disclosure. The wireless communications system 300 may include base station 105-b and UE 115-b, which may be examples of a base station 105 and a UE 115, as described with reference to FIGS. 1 and 2. Base station 105-b may provide network coverage for geographic area 110-b. Base station 105-b and UE 115-b may communicate using beamformed or directional transmissions (e.g., for both uplink and downlink transmissions). As illustrated, UE 115-b may monitor a channel utilizing multiple receive beams 305 (e.g., downlink receive beams 305-a, 305-b, and 305-c). UE 115-b may receive a signal 310 from base station 105-b over at least two receive beams 305 that are distorted by interference, spatially white noise, or some combination of the two. Based on noise measurements over the at least two receive beams 305, UE 115-b may determine the levels of interference or spatially white noise associated with the detected noise. As discussed herein, the following processes discussed with respect to UE 115-b may additionally or alternatively be performed by base station 105-b or by a UE 115 operating in a D2D mode. Furthermore, any of the following processes may be performed in addition to the signal direction determination and beam selection processes described herein, for example, with reference to FIG. 2.

UE 115-b may monitor a channel using a set of downlink receive beams 305. For example, UE 115-b may monitor the channel using downlink receive beams 305-a, 305-b, and 305-c, which may be a subset of a total number of possible beams operated by UE 115-b. UE 115-b may receive a signal 310 from base station 105-b on one or more downlink receive beams 305. UE 115-b may additionally measure a level of noise associated with the received signal 310 over each of the downlink receive beams 305 that received the signal 310. UE 115-b may compare the noise level measurements between downlink receive beams 305 to differentiate whether the noise corresponds to white noise, an interferer, or both.

For example, UE 115-b may receive signal 310 over at least two downlink receive beams 305 (e.g., beams 305-a and 305-b). UE 115-b may measure the level of noise associated with the signal 310 received over downlink receive beam 305-a and received over downlink receive beam 305-b. UE 115-b may compare these noise level measurements to estimate or identify the nature of the noise. For example, UE 115-b may determine a difference of the noise level measurements for the downlink receive beams 305-a and 305-b, and may compare the difference to a noise level threshold value (e.g., a pre-determined or dynamically-determined threshold amount). If the noise level measurements between beams 305 are equal or similar to each other (e.g., if the difference in noise level measurements between beams 305 is less than the noise level threshold), UE 115-b may determine that the detected noise corresponds to random white noise (e.g., spatially white noise, such as additive white Gaussian noise (AWGN)). However, if the noise level measurements between beams 305 are not similar to each other (e.g., if the difference in noise level measurements between beams 305 is greater than or equal to the noise level threshold), UE 115-b may determine that the detected noise, or a portion of the detected noise, corresponds to interference.

UE 115-b may utilize the differentiation between white noise and interference to perform reception or demodulation processes. For example, UE 115-b may calculate noise variance, interference variance, or both for signal demodulation (e.g., for signal 310) based on determining the nature of the noise. Similarly, UE 115-b may map signal qualities for the downlink receive beams 305 to demodulation metrics (e.g., block error rate (BLER), or other related demodulation metrics) based on the determined type of noise. Additionally or alternatively, UE 115-b may attempt to cancel an interferer based on the determination.

If UE 115-b detects an interferer (e.g., an interfering device, an interfering signal, an interfering object, etc.), UE 115-b may additionally determine the direction of the interferer. For example, UE 115-b may use similar techniques to those described herein—for example, with respect to FIG. 2—to determine the direction between UE 115-b and the interferer. UE 115-b may store lookup tables, formulas, or equations in memory that correspond to interference measurements over different downlink receive beams 305 to determine the direction of the interferer. For example, UE 115-b may detect interference received with signal 310 over beam 305-a—but may detect less or no interference received with signal 310 over beam 305-b—and may determine direction 320 corresponds to an interferer 315 (e.g., in this case, another transmitting device). UE 115-b may use this determined direction 320 of the interferer 315 for communication or demodulation. For example, UE 115-b may perform procedures to cancel the interference caused by interferer 315 based on determining direction 320. Additionally or alternatively, UE 115-b may select a beam for communication based on the determined direction 320. For example, UE 115-b may select a direction for the beam to base station 105-b that avoids or reduces interference from interferer 315. In other cases, UE 115-b may connect or disconnect with a base station 105 based on the direction 320 of the interferer 315. For example, base station 105-b may be the closest base station 105 to UE 115-b, but UE 115-b may connect and communicate with a different base station 105 based on the presence of interferer 315. In another example, UE 115-b may monitor a radio link with base station 105-b, and may determine failure of the radio link based on detecting the interferer 315. For example, UE 115-a may modify a radio link failure criterion or threshold based on the presence of interferer 315.

In some cases, UE 115-b may receive signal 310 over more than two downlink receive beams 305. In these cases, UE 115-b may compare noise level measurements for more than two downlink receive beams 305 to determine white noise, interference, or both. For example, if UE 115-b detects a similar level of noise over beams 305-b and 305-c, but a greater level of noise over beam 305-a for signal 310, UE 115-b may determine that the channel is experiencing a level of random white noise (e.g., corresponding to the level of noise over beam 305-b or 305-c) along with a level of interference (e.g., corresponding to the level of noise over beam 305-a minus the random white noise, i.e., the level of noise over beam 305-b or 305-c). In some cases, UE 115-b may select which downlink receive beams 305 to use for determining the type of noise when receiving the signal 310 on multiple downlink receive beams 305.

Figure 4:
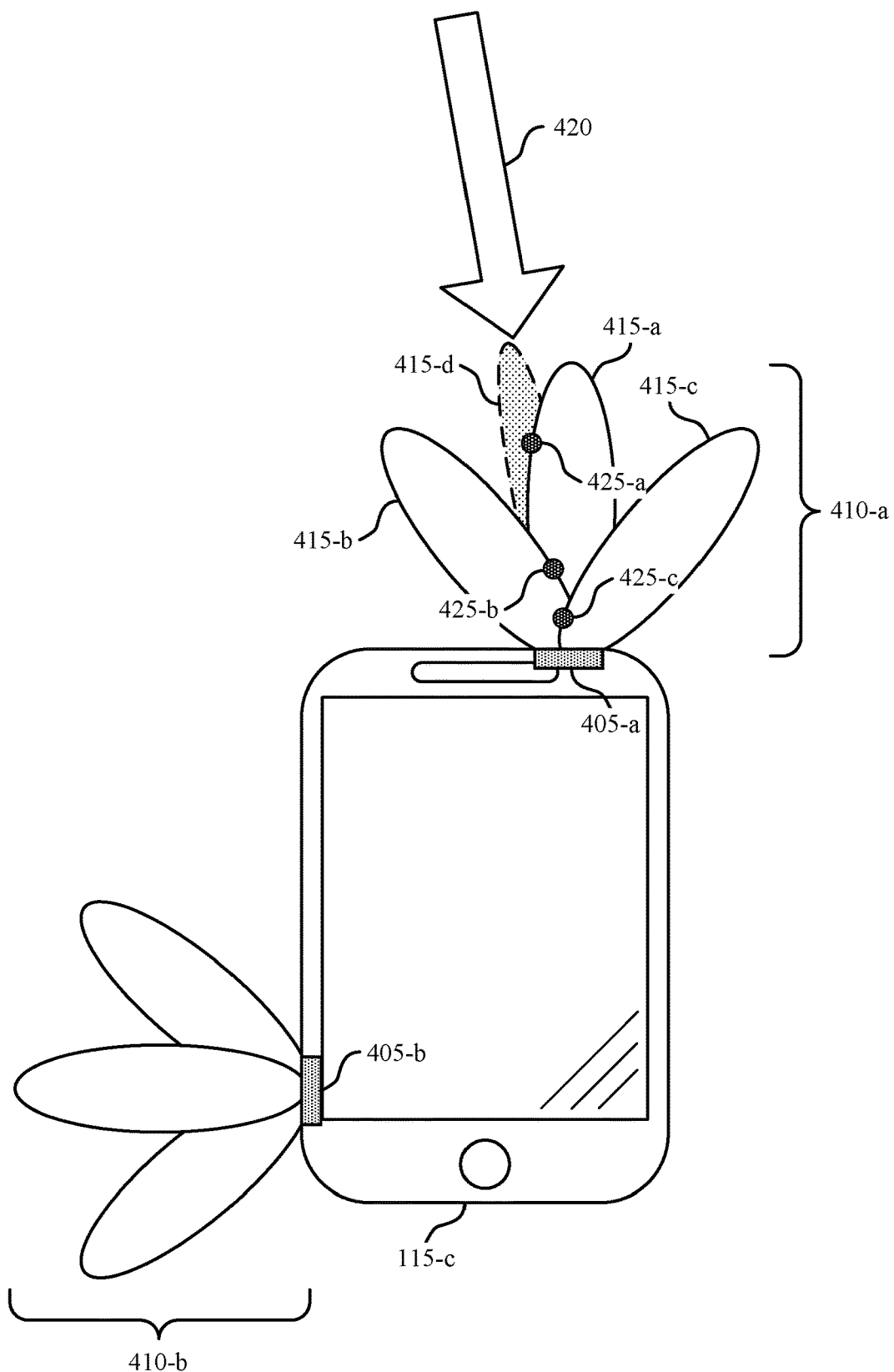
FIG. 4 illustrates an exemplary process for determining signal direction using multiple receive beams in accordance with aspects of the present disclosure.

FIG. 4 illustrates an exemplary process for determining signal direction 400 using multiple receive beams in accordance with various aspects of the present disclosure. The exemplary process for determining signal direction 400 may include a wireless device, which may be an example of a UE 115 (e.g., UE 115-c) or a base station 105 as described herein with reference to FIGS. 1 through 3. UE 115-c may monitor for signals using one or more antenna arrays 405 and one or more beams 415. Upon receiving a signal 420, UE 115-c may determine a signal direction, a type of noise, or both based on signal measurements for the signal 420 over multiple beams 415.

UE 115-c may utilize one or more antenna arrays 405 to monitor for signals 420. For example, UE 115-c may use antenna array 405-a operating a set of beams 410-a and antenna array 405-b operating a set of beams 410-b to monitor one or more channels. The beams 415 used for monitoring may be a subset of a total set of beams for UE 115-c. For example, UE 115-c may monitor for signals using beams 415-a, 415-b, and 415-c, but may not use beam 415-d. In this way, UE 115-c may monitor for signals using a set of downlink beams 415.

UE 115-c may receive a signal 420 at one or more antenna arrays 405 over one or more beams 415. For example, as illustrated, UE 115-c may receive signal 420 over beams 415-a, 415-b, and 415-c. The UE 115-c may use the received signal strength or signal power measured for signal 420 at each of these beams 415 to determine in which direction UE 115-c received signal 420. For example, as illustrated, beam 415-a may initially receive signal 420 at point 425-a, beam 415-b may initially receive signal 420 at point 425-b, and beam 415-c may initially receive signal 420 at point 425-c. The point 425 at which a beam 415 initially receives a signal 420 may be correlated with the signal strength or antenna gain associated with receiving the signal 420. For example, beam 415-a receiving the signal 420 at point 425-a may result in a greater received signal power than beam 415-b receiving the same signal 420 at point 425-b (e.g., as beam 415-a receives the signal 420 nearer to the apex of the beam, or correspondingly beam 415-a and signal 420 are nearer in directional alignment). UE 115-c may include one or more indications of relationships between signal measurements at different beams 415. For example, UE 115-c may include a direction corresponding to the measured received signal strengths at beams 415-a, 415-b, 415-c, or any combination of these. That is, a lookup table, equation, or formula may relate the signal measurements at beam 415-a, 415-b, 415-c, or any combination of these to the points 425 receiving the signal 420. If UE 115-c determines the points 425 for at least two beams 415, UE 115-c may determine the signal direction (e.g., based on the line of intersection between the at least two points 425). For example, UE 115-c may determine points 425-a and 425-b based on received signal strength measurements or gains of signal 420, and may determine that the signal direction is in line with points 425-a and 425-b.

In some cases, UE 115-c may determine an estimated receive signal strength or estimated gain (e.g., antenna gain or overall gain) for a beam 415 that does not receive a signal 420. For example, UE 115-c may not monitor for signals with beam 415-d (e.g., in some cases, communication beam 415-d may not be included in the set of receive beams 415). However, based on determining the signal direction for signal 420 using other beams 415 (e.g., beams 415-a and 415-b), UE 115-c may use similar lookup tables, equations, or functions as before to determine an estimated signal strength or gain for beam 415-d. Rather than use the indications in memory to determine a signal direction based on signal measurements at a beam 415, UE 115-c may estimate the signal measurements at a beam 415 (e.g., beam 415-d) based on the determined signal direction. In this way, UE 115-c may estimate the "best" beam 415 (e.g., a beam 415 with the greatest gain in the signal direction), and may select this beam 415 for communications in the determined direction. Accordingly, UE 115-c may receive signals 420 using a subset of beams 415 (e.g., a set of receive beams), may determine the corresponding signal direction, and may select a beam 415 for communication in that direction (e.g., from a set of communication beams different than, or in some examples, the same as the set of receive beams) that is or is not included in the subset.

Figure 5:
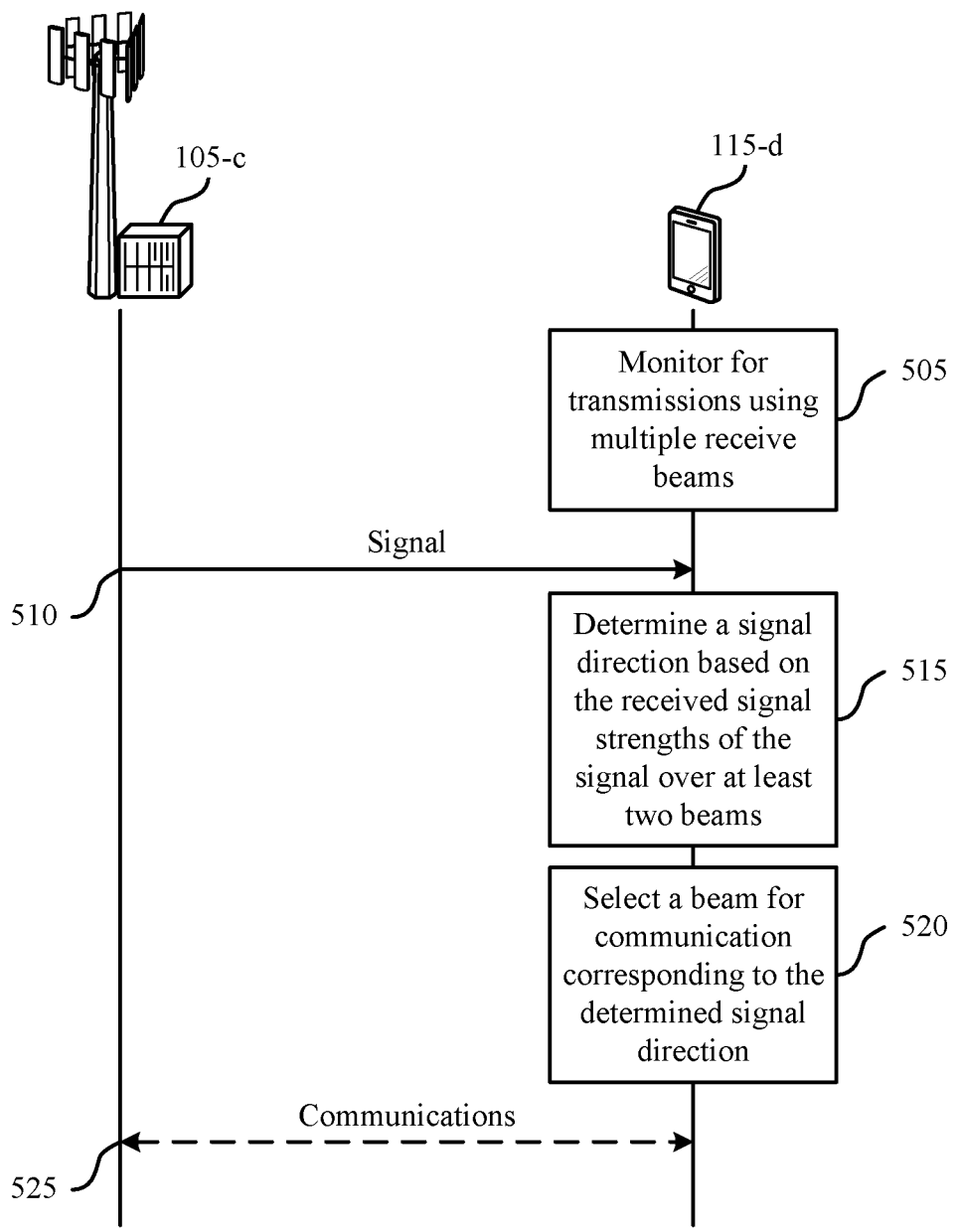
FIGS. 5 and 6 illustrate examples of process flows that support determining signal direction and interference using multiple receive beams in accordance with aspects of the present disclosure.

FIG. 5 illustrates a process flow 500 that supports determining signal direction and interference using multiple receive beams in accordance with various aspects of the present disclosure. The process flow 500 may include base station 105-c and UE 115-d, which may be examples of the corresponding devices as described with reference to FIGS. 1 through 4. UE 115-d may select a beam for communication based on receiving a signal over multiple beams. It should be understood that the processes and features described herein with respect to UE 115-d may be performed or otherwise implemented by other wireless devices, such as base station 105-c.

At 505, UE 115-d may monitor for transmissions using multiple receive beams (e.g., downlink receive beams). These receive beams may be a subset of beams operable by UE 115-d.

At 510, UE 115-d may receive a signal from base station 105-c over at least two of the receive beams. For example, UE 115-d may receive the signal using at least a first receive beam of the set of receive beams and a second receive beam of the set of receive beams. At 515, UE 115-d may determine a signal direction of the received signal based on the received signal strengths at the receive beams. For example, UE 115-d may determine the direction of the signal based on a relationship between a first received signal strength for the signal corresponding to the first receive beam and a second received signal strength for the signal corresponding to the second receive beam. UE 115-d may calculate a difference in received signal strengths for the at least two receive beams, or may identify gains corresponding to the received signal strengths of the signal at the receive beams, and may access a lookup table or a function to determine a signal direction corresponding to the difference in signal strengths or the identified gains.

At 520, UE 115-d may select a beam for communication corresponding to the determined signal direction. For example, UE 115-d may select the communication beam from a set of communication beams, where the set of communication beams is different from the set of receive beams used to monitor for transmissions. In some cases, the set of receive beams may be a subset of the set of communication beams. In other cases, the set of receive beams and the set of communication beams may be partially or fully disjoint. UE 115-d may determine a beam index, a beam direction, a beam width, one or more antenna elements for operating the beam, or any combination of these or other beam characteristics based on the determined signal direction. At 525, UE 115-d and base station 105-c may communicate using the selected communication beam. For example, if the selected beam is an example of a downlink receive beam, UE 115-d may monitor for and receive additional signals from base station 105-c using the beam (e.g., in a beam direction equal to or similar to the determined signal direction). If the selected beam is an example of an uplink transmit beam, UE 115-d may transmit messages to base station 105-c using the beam (e.g., in a beam direction opposite or close to opposite of the signal direction). In some cases, this selected beam may be narrower than the multiple receive beams used to monitor for signals. The selected beam may be one of the multiple receive beams, or may be another beam not used to initially monitor the channel.

Figure 6:
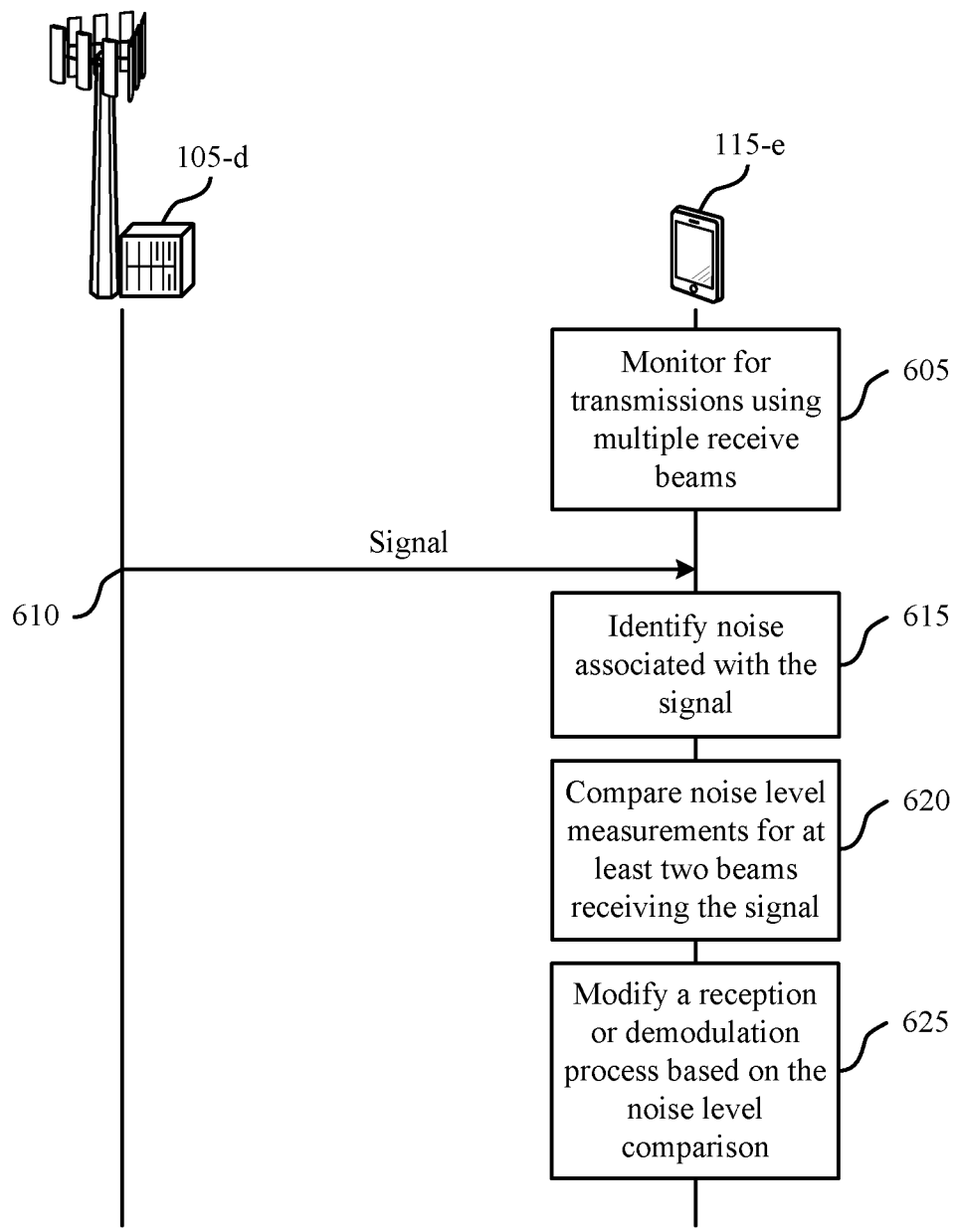

FIG. 6 illustrates a process flow 600 that supports determining signal direction and interference using multiple receive beams in accordance with various aspects of the present disclosure. The process flow 600 may include base station 105-d and UE 115-e, which may be examples of the corresponding devices as described with reference to FIGS. 1 through 5. UE 115-e may determine a type of noise affecting a received signal based on receiving the signal over multiple beams. It should be understood that the processes and features described herein with respect to UE 115-e may be performed or otherwise implemented by other wireless devices, such as base station 105-d.

At 605, UE 115-e may monitor for transmissions using multiple receive beams (e.g., downlink receive beams). These receive beams may be a subset of beams operable by UE 115-e.

At 610, UE 115-e may receive a signal from base station 105-d over at least two of the receive beams. At 615, UE 115-e may identify noise associated with the signal received over these beams.

At 620, UE 115-e may compare noise level measurements for these beams receiving the signal. For example, UE 115-e may determine whether the identified noise corresponds to interference or white noise. In some cases, UE 115-e may determine whether the noise level measurements over the at least two beams differ by less than a threshold amount (e.g., a noise level threshold value), where UE 115-e may determine that the noise corresponds to white noise if the difference is less than the threshold amount, or interference if the difference is not less than the threshold amount. In other cases, UE 115-e may determine that the noise includes a level of random noise (e.g., spatially white noise, such as AWGN) and a level of interference.

At 625, UE 115-e may modify a reception or demodulation process based on the noise level comparison. For example, UE 115-e may modify demodulation parameters or processes depending on the type of noise detected (e.g., either white noise, interference, or a mix of the two). In other cases, UE 115-e may modify a beam selected for communication with base station 105-d (e.g., an uplink transmit beam or a downlink reception beam) based on the type of noise. For example, if UE 115-e determines that the noise involves interference, UE 115-e may determine the direction of the source of the interference, and may select the beam for communication based on this determined direction.

Figure 7:
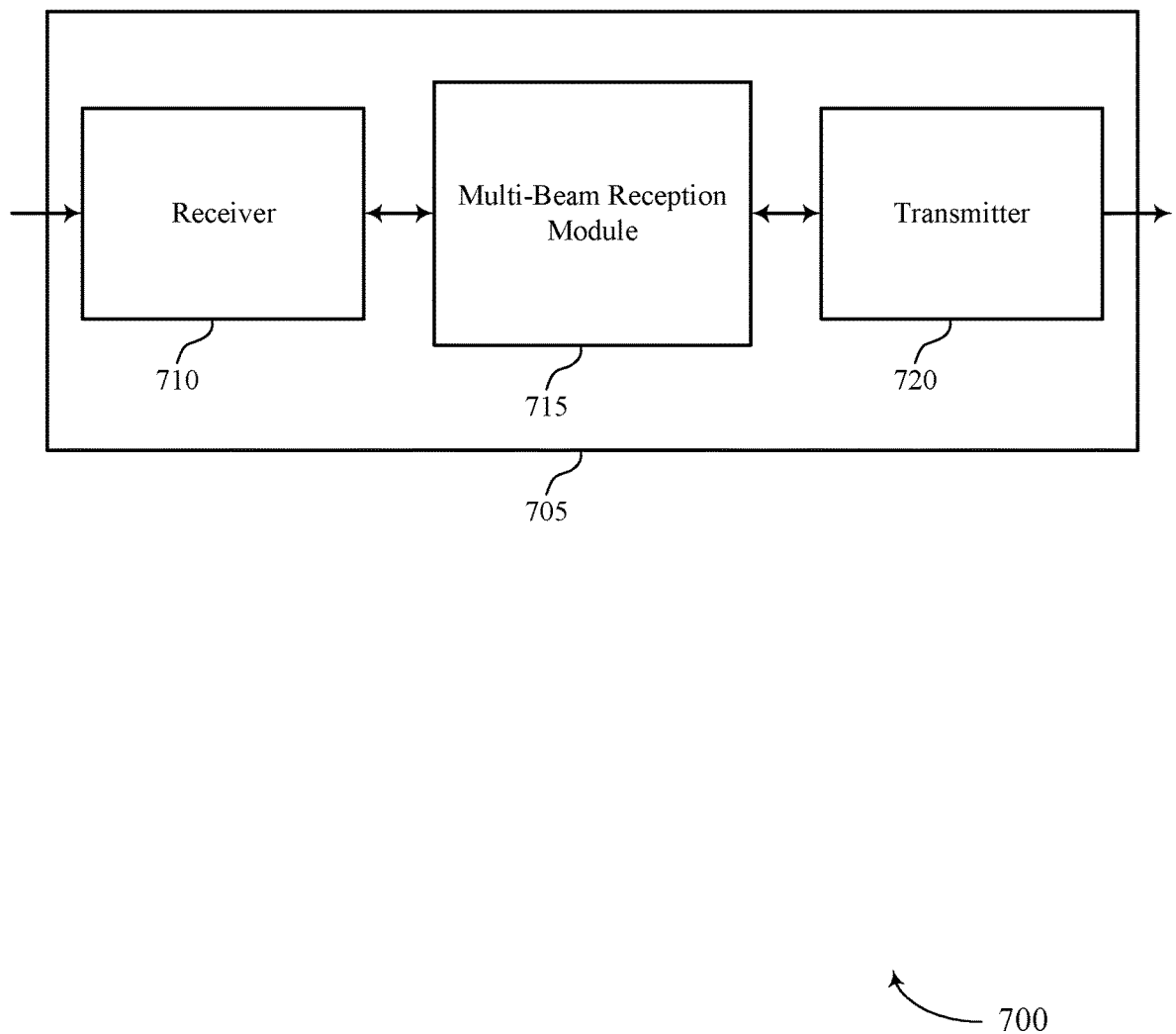
FIGS. 7 through 9 show block diagrams of a device that supports determining signal direction and interference using multiple receive beams in accordance with aspects of the present disclosure.

FIG. 7 shows a block diagram 700 of a wireless device 705 that supports determining signal direction and interference using multiple receive beams in accordance with aspects of the present disclosure. Wireless device 705 may be an example of aspects of a UE 115 or base station 105 as described herein. Wireless device 705 may include receiver 710, multi-beam reception module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to determining signal direction and interference using multiple receive beams, etc.). Information may be passed on to other components of the device. The receiver 710 may be an example of aspects of the transceiver 1035 or 1135 described with reference to FIGS. 10 and 11. The receiver 710 may utilize a single antenna or a set of antennas.

Multi-beam reception module 715 may be an example of aspects of the UE multi-beam reception module 1015 or the base station multi-beam reception module 1115 described with reference to FIGS. 10 and 11. Multi-beam reception module 715 and/or at least some of its various sub-components may be implemented in hardware, software executed by a processor, firmware, or any combination thereof. If implemented in software executed by a processor, the functions of the multi-beam reception module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The multi-beam reception module 715 and/or at least some of its various sub-components may be physically located at various positions, including being distributed such that portions of functions are implemented at different physical locations by one or more physical devices. In some examples, multi-beam reception module 715 and/or at least some of its various sub-components may be a separate and distinct component in accordance with various aspects of the present disclosure. In other examples, multi-beam reception module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, multi-beam reception module 715 may monitor for transmissions using a set of receive beams, receive a signal using at least a first receive beam of the set of receive beams and a second receive beam of the set of receive beams, determine a direction of the signal based on a relationship between a first received signal strength for the signal corresponding to the first receive beam and a second received signal strength for the signal corresponding to the second receive beam, select, from a set of communication beams, a communication beam corresponding to the determined direction of the signal, where the set of communication beams is different from the set of receive beams used to monitor for transmissions, and utilize the selected communication beam for communication. Additionally or alternatively, the multi-beam reception module 715 may monitor for transmissions using a set of receive beams, receive a signal over at least two beams of the set of receive beams, identify noise associated with the signal received over the at least two beams, compare noise level measurements of the identified noise for the at least two beams, and modify a reception or demodulation process based on the comparing.

Transmitter 720 may transmit signals generated by other components of the device. In some examples, the transmitter 720 may be collocated with a receiver 710 in a transceiver module. For example, the transmitter 720 may be an example of aspects of the transceiver 1035 or 1135 described with reference to FIGS. 10 and 11. The transmitter 720 may utilize a single antenna or a set of antennas.

Figure 8:
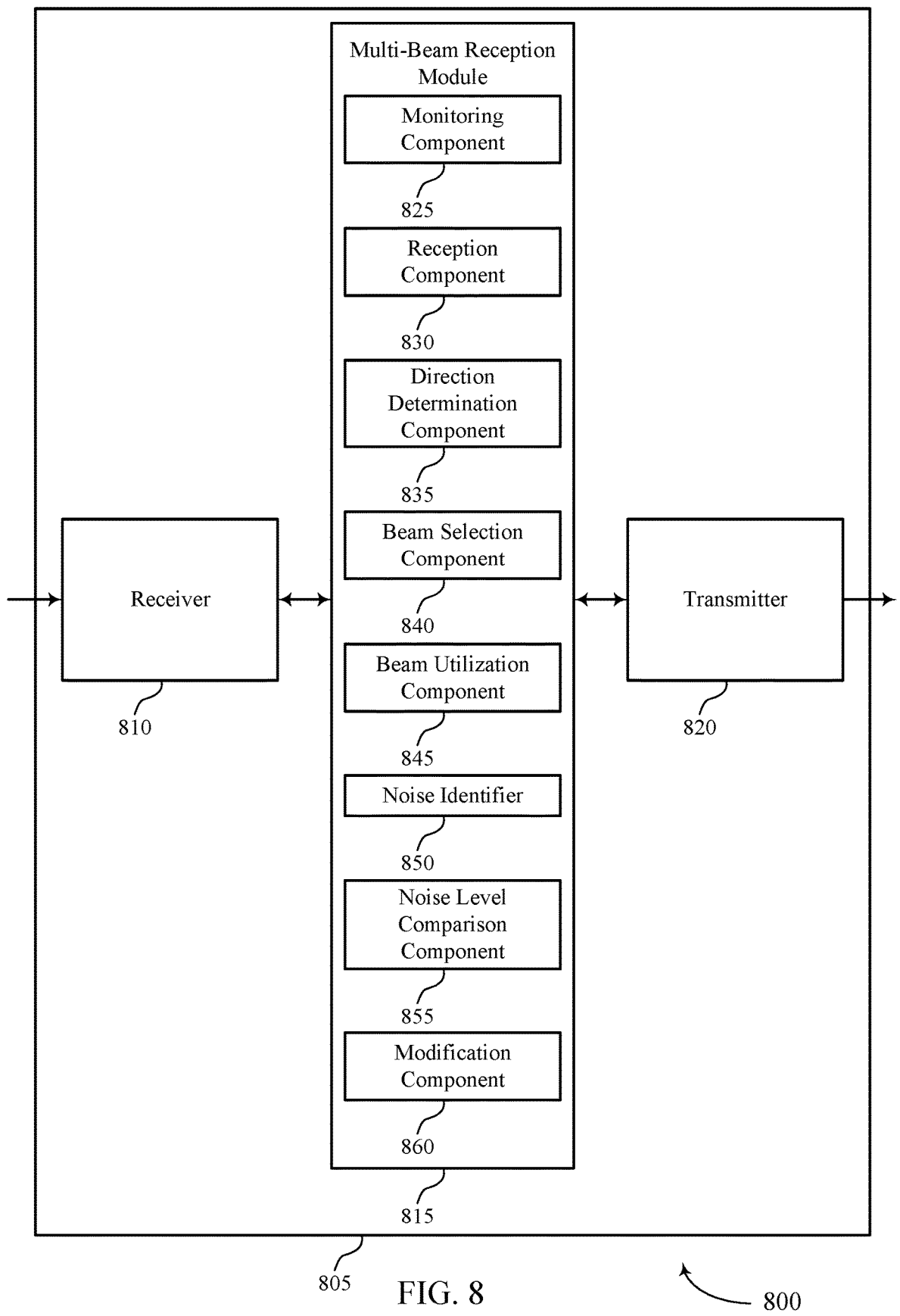

FIG. 8 shows a block diagram 800 of a wireless device 805 that supports determining signal direction and interference using multiple receive beams in accordance with aspects of the present disclosure. Wireless device 805 may be an example of aspects of a wireless device 705, UE 115, or base station 105 as described herein with reference to FIGS. 1 through 7. Wireless device 805 may include receiver 810, multi-beam reception module 815, and transmitter 820. Wireless device 805 may also include one or more processors, memory coupled with the one or more processors, and instructions stored in the memory that are executable by the one or more processors to enable the one or more processors to perform the roaming features discussed herein. Each of these components may be in communication with one another (e.g., via one or more buses).

Receiver 810 may receive information such as packets, user data, or control information associated with various information channels (e.g., control channels, data channels, and information related to determining signal direction and interference using multiple receive beams, etc.). Information may be passed on to other components of the device. The receiver 810 may be an example of aspects of the transceiver 1035 or 1135 described with reference to FIGS. 10 and 11. The receiver 810 may utilize a single antenna or a set of antennas.

Multi-beam reception module 815 may be an example of aspects of the multi-beam reception module 1015 or 1115 described with reference to FIGS. 10 and 11.

Multi-beam reception module 815 may also include monitoring component 825, reception component 830, direction determination component 835, beam selection component 840, beam utilization component 845, noise identifier 850, noise level comparison component 855, and modification component 860.

Monitoring component 825 may monitor for transmissions using a set of receive beams. Reception component 830 may receive a signal over at least two beams of the set of receive beams. For example, reception component 830 may receive a signal using at least a first receive beam of the set of receive beams and a second receive beam of the set of receive beams.

In some cases, direction determination component 835 may determine a direction (e.g., a signal direction of the signal) based on received signal strengths of the signal for the at least two beams. For example, direction determination component 835 may determine a direction of the signal based on a relationship between a first receive signal strength of the signal corresponding to the first receive beam and a second received signal strength of the signal corresponding to the second receive beam. Beam selection component 840 may select a beam (e.g., a communication beam) corresponding to the determined direction. In some cases, beam selection component 840 may select the communication beam corresponding to the determined direction of the signal from a set of communication beams, where the set of communication beams may be different than the set of receive beams used to monitor for transmissions, for example where one or more beams are different between the set of communication beams and the set of receive beams. In other cases, the set of communication beams may be the same as the set of receive beams used to monitor for transmissions. Beam utilization component 845 may utilize the selected beam (e.g., the selected communication beam) for communication.

In other cases, noise identifier 850 may identify noise associated with the signal received over the at least two beams. Noise level comparison component 855 may compare noise level measurements of the identified noise for the at least two beams. Modification component 860 may modify a reception or demodulation process based on the comparing.

Transmitter 820 may transmit signals generated by other components of the device. In some examples, the transmitter 820 may be collocated with a receiver 810 in a transceiver module. For example, the transmitter 820 may be an example of aspects of the transceiver 1035 or 1135 described with reference to FIGS. 10 and 11. The transmitter 820 may utilize a single antenna or a set of antennas.

Figure 9:
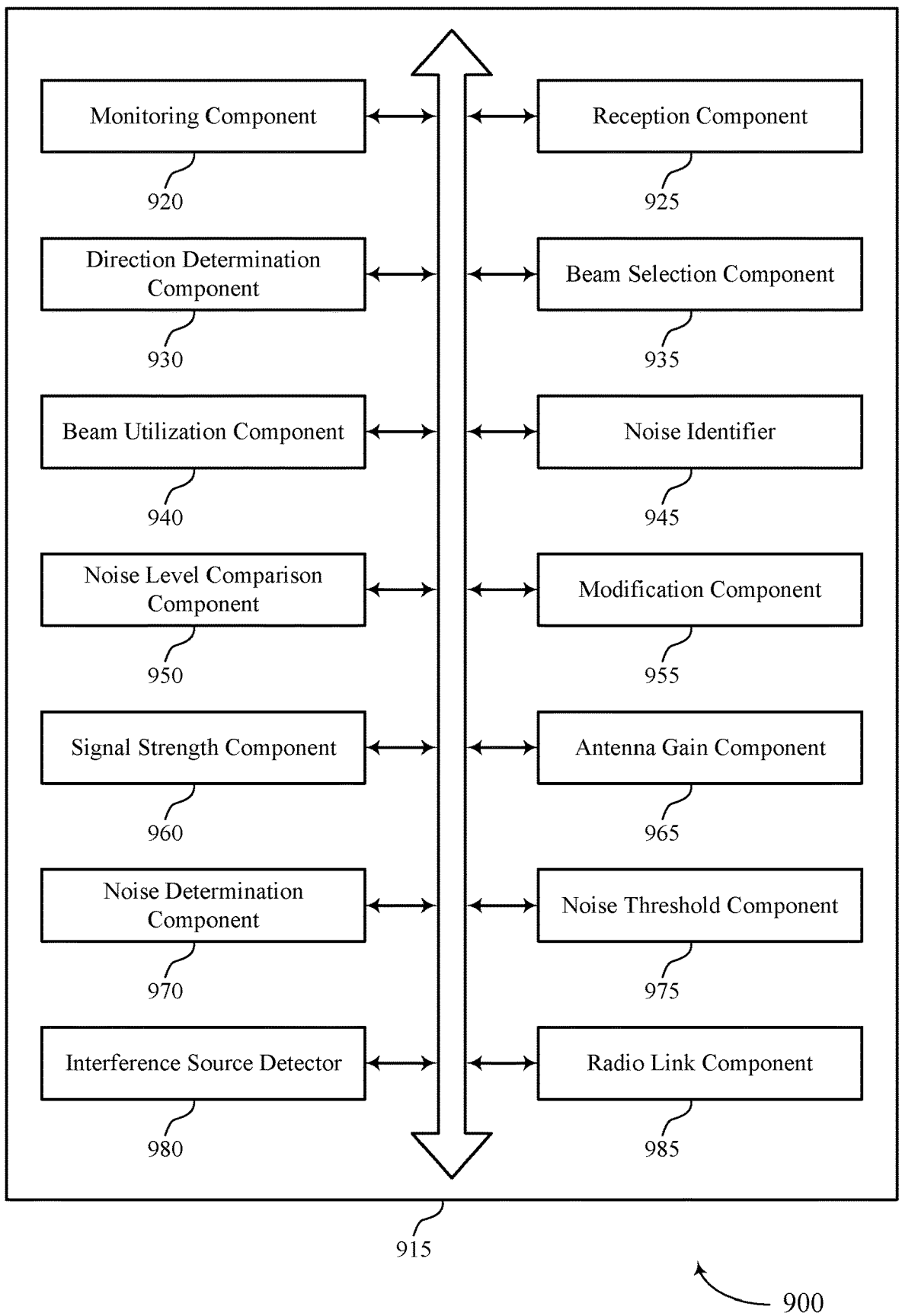

FIG. 9 shows a block diagram 900 of a multi-beam reception module 915 that supports determining signal direction and interference using multiple receive beams in accordance with aspects of the present disclosure. The multi-beam reception module 915 may be an example of aspects of a multi-beam reception module 715, a multi-beam reception module 815, a UE multi-beam reception module 1015, or a base station multi-beam reception module 1115 described with reference to FIGS. 7, 8, 10, and 11. The multi-beam reception module 915 may include monitoring component 920, reception component 925, direction determination component 930, beam selection component 935, beam utilization component 940, noise identifier 945, noise level comparison component 950, modification component 955, signal strength component 960, antenna gain component 965, noise determination component 970, noise threshold component 975, interference source detector 980, and radio link component 985. Each of these modules may communicate, directly or indirectly, with one another (e.g., via one or more buses).

In some implementations, monitoring component 920 may monitor for transmissions using a set of receive beams. In some cases, the set of receive beams include a subset of a total set of configurable beams. Reception component 925 may receive a signal over at least two beams of the set of receive beams. For example, reception component 925 may receive the signal using at least a first receive beam of the set of receive beams and a second receive beam of the set of receive beams.

Direction determination component 930 may determine a direction based on received signal strengths of the signal for the at least two beams. In some cases, the direction may be an example of a signal direction of the signal. For example, direction determination component 930 may determine a direction of the signal based on a relationship between a first received signal strength for the signal corresponding to the first receive beam and a second received signal strength for the signal corresponding to the second receive beam.

Beam selection component 935 may select a beam corresponding to the determined direction. For example, beam selection component 935 may select, from a set of communication beams, a communication beam corresponding to the determined direction of the signal, where the set of communication beams is different from the set of receive beams (e.g., the receive beams used to monitor for transmissions). In some cases, the set of receive beams is a subset of the set of communication beams. The selected communication beam may be different from each beam of the set of receive beams.

In some cases, beam selection component 935 may determine an estimated received signal strength for the selected communication beam corresponding to the determined direction of the signal. Additionally or alternatively, beam selection component 935 may receive, in different directions, one or more additional signals over one or more receive beams of the set of receive beams and may estimate additional received signal strengths for the one or more additional signals received in the different directions, where selecting the communication beam is further based on the estimated additional received signal strengths (e.g., the beam direction for the selected beam may correspond to the signal direction for the signal received with the greatest signal strength). In some cases, the selected beam for communication is not included in the set of receive beams. In some cases, selecting the communication beam includes determining an index of the selected communication beam, a beam direction of the selected communication beam, a width of the selected communication beam, one or more antenna elements for the selected communication beam, or a combination thereof. In some cases, selecting the beam is further based on maximizing an estimated antenna gain for the selected communication beam. In some cases, the set of receive beams include wider beams than the selected beam for communication. For example, at least one of the set of receive beams is wider than the selected communication beam.

Beam utilization component 940 may utilize the selected communication beam for communication. In some cases, utilizing the selected beam for communication includes monitoring for additional transmissions using the selected beam (e.g., where the selected beam is an example of a receive beam), and receiving one or more additional signals over the selected beam. In other cases, utilizing the selected beam for communication includes transmitting one or more signals using the selected beam (e.g., where the selected beam includes a transmit beam).

In some cases, the relationship between the first received signal strength and the second received signal strength may be an example of a difference between the first received signal strength and the second received signal strength. Signal strength component 960 may calculate a difference in the received signal strengths of the signal for the at least two beams, where the signal direction is determined based on the difference in the received signal strengths. In some cases, determining the direction of the signal involves accessing a lookup table in memory, where the lookup table includes indications of differences in received signal strengths and corresponding signal directions. In some cases, determining the direction of the signal involves inputting the difference between the first received signal strength and the second received signal strength into a function and obtaining the direction of the signal as an output of the function.

Antenna gain component 965 may identify antenna gains corresponding to the received signal strengths of the signal for the at least two beams, where the signal direction is determined based on the identified antenna gains. For example, antenna gain component 965 may identify a first antenna gain corresponding to the first received signal strength for the signal corresponding to the first receive beam and a second antenna gain corresponding to the second received signal strength for the signal corresponding to the second receive beam, where the direction of the signal is determined based on the identified first antenna gain and the identified second antenna gain. In some cases, determining the signal direction includes accessing one or more lookup tables in memory, where the one or more lookup tables include indications of different antenna gains and corresponding signal directions. In some cases, determining the signal direction includes inputting the identified antenna gains (e.g., the identified first antenna gain and the identified second antenna gain) into a function and obtaining the signal direction as an output of the function. In some cases, antenna gain component 965 may estimate an antenna gain for an inactive beam that is not included in the set of receive beams based on the determined signal direction. For example, antenna gain component 965 may estimate an antenna gain for at least one communication beam of the set of communication beams different from each of the set of receive beams based on the determined direction of the signal.

In some cases, noise identifier 945, noise level comparison component 950, modification component 955, noise determination component 970, interference source detector 980, or some combination of these components may operate in these implementations. For example, noise identifier 945 may identify noise associated with the signal and noise level comparison component 950 may compare a first noise level of the identified noise for the first receive beam to a second noise level of the identified noise for the second receive beam, where selecting the communication beam is further based on the comparing.

Modification component 955 may modify a reception or demodulation process based on the comparing, where the communication further utilizes the modified reception or demodulation process. In some cases, modifying the reception or demodulation process includes mapping signal qualities from the at least two beams to demodulation metrics based on the comparing. For example, modification component 955 may map a first signal quality from the first receive beam to a first demodulation metric and a second signal quality from the second receive beam to a second demodulation metric based on the comparing.

Noise determination component 970 may determine whether the identified noise corresponds to interference or spatially white noise, where modifying the reception or demodulation process is further based on the determining. Interference source detector 980 may detect an interference source based on the comparing and may determine a direction of the interference source based on the first noise level of the identified noise, the second noise level of the identified noise, or a combination thereof. Beam selection component 935 may select a beam direction for communication, where the communication beam is further selected based on the determined direction of the interference source.

In other implementations, monitoring component 920 may monitor for transmissions using a set of receive beams. Reception component 925 may receive a signal over at least two beams of the set of receive beams. Noise identifier 945 may identify noise associated with the signal received over the at least two beams.

Noise level comparison component 950 may compare noise level measurements of the identified noise for the at least two beams. Modification component 955 may modify a reception or demodulation process based on the comparing. In some cases, modifying the reception or demodulation process includes calculating noise variance and interference variance for signal demodulation based on the determining. In some cases, modifying the reception or demodulation process includes mapping signal qualities from the at least two beams to demodulation metrics based on the comparing. In some cases, modifying the reception or demodulation process includes selecting a beam for reception based on the comparing.

Noise determination component 970 may determine whether the identified noise corresponds to interference or spatially white noise, where modifying the reception or demodulation process is further based on the determining. In some cases, comparing the noise level measurements may include noise threshold component 975 determining whether the noise level measurements differ by less than a threshold amount. In some cases, noise threshold component 975 may determine that the identified noise corresponds to spatially white noise if the noise level measurements differ by less than the threshold amount, and in other cases, noise threshold component 975 may determine that the identified noise corresponds to interference if the noise level measurements differ by more than the threshold amount.

Interference source detector 980 may detect an interference source based on the comparing and may determine a direction of the interference source based on received signal strengths of the signal for the at least two beams. Beam selection component 935 may select a beam direction for communication, where the selected beam direction is based on the determined direction of the interference source.

Radio link component 985 may monitor a radio link and determine failure of the radio link based on the comparing.

Figure 10:
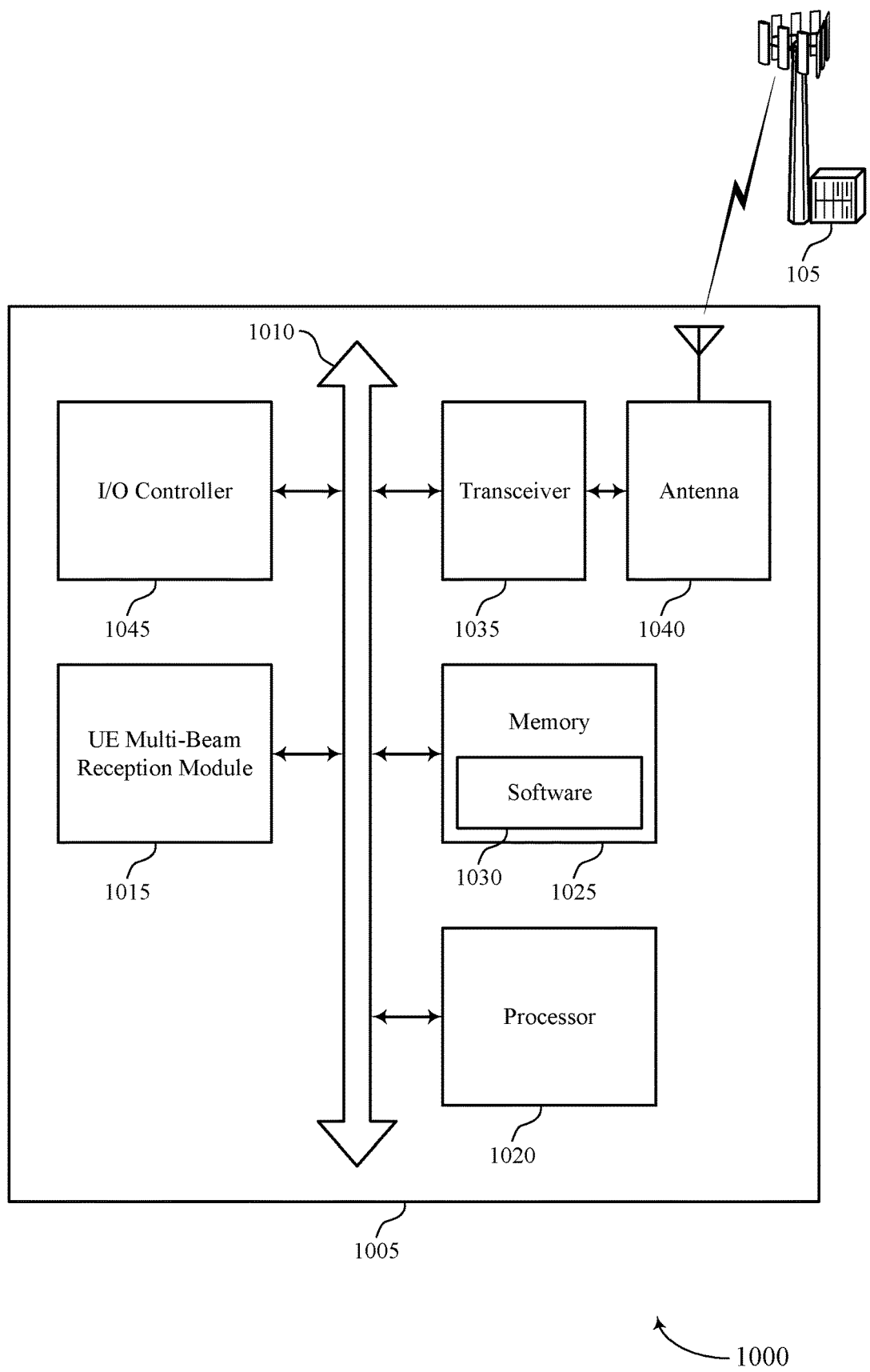
FIG. 10 illustrates a block diagram of a system including a user equipment (UE) that supports determining signal direction and interference using multiple receive beams in accordance with aspects of the present disclosure.

FIG. 10 shows a diagram of a system 1000 including a device 1005 that supports determining signal direction and interference using multiple receive beams in accordance with aspects of the present disclosure. Device 1005 may be an example of or include the components of wireless device 705, wireless device 805, or a UE 115 as described herein, e.g., with reference to FIGS. 1 through 8. Device 1005 may include components for bi-directional voice and data communications including components for transmitting and receiving communications, including UE multi-beam reception module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105. UE multi-beam reception module 1015 may perform one or more functions as described with reference to the multi-beam reception module 715, the multi-beam reception module 815, the multi-beam reception module 915, or some combination thereof as described herein with reference to FIGS. 7 through 9.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting determining signal direction and interference using multiple receive beams).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support determining signal direction and interference using multiple receive beams. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
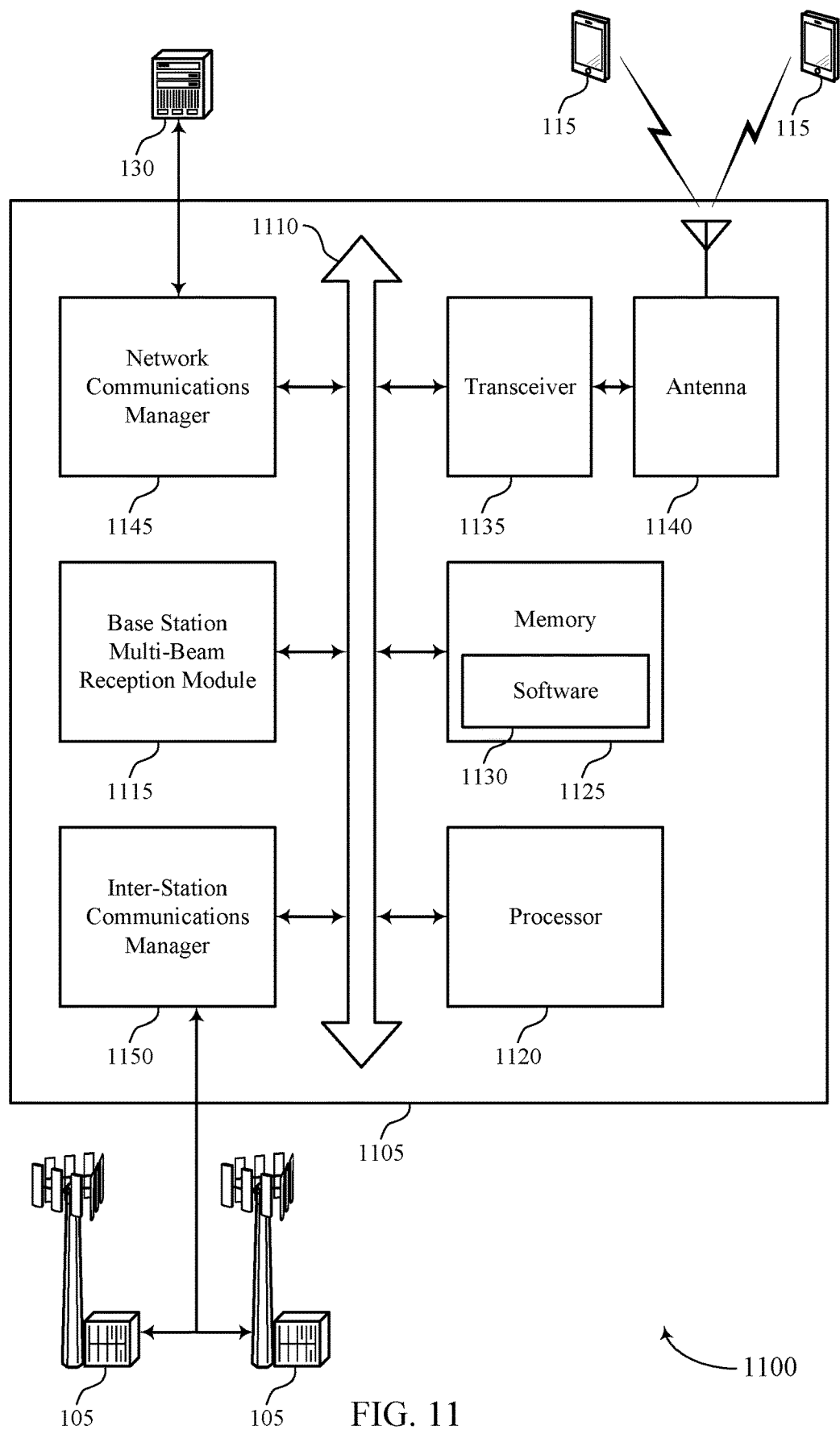
FIG. 11 illustrates a block diagram of a system including a base station that supports determining signal direction and interference using multiple receive beams in accordance with aspects of the present disclosure.

FIG. 11 shows a diagram of a system 1100 including a device 1105 that supports determining signal direction and interference using multiple receive beams in accordance with aspects of the present disclosure. Device 1105 may be an example of or include the components of a wireless device 705, wireless device 805, or a base station 105 as described herein, e.g., with reference to FIGS. 1 through 8. Device 1105 may include components for bi-directional voice and data communications including components for transmitting and receiving communications, including base station multi-beam reception module 1115, processor 1120, memory 1125, software 1130, transceiver 1135, antenna 1140, network communications manager 1145, and inter-station communications manager 1150. These components may be in electronic communication via one or more buses (e.g., bus 1110). Device 1105 may communicate wirelessly with one or more UEs 115. Base station multi-beam reception module 1115 may perform one or more functions as described with reference to the multi-beam reception module 715, the multi-beam reception module 815, the multi-beam reception module 915, or some combination thereof as described herein with reference to FIGS. 7 through 9

Processor 1120 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting determining signal direction and interference using multiple receive beams).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support determining signal direction and interference using multiple receive beams. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described herein. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Inter-station communications manager 1150 may manage communications with other base station 105 and may include a controller or scheduler for controlling communications with UEs 115 in cooperation with other base stations 105. For example, the inter-station communications manager 1150 may coordinate scheduling for transmissions to UEs 115 for various interference mitigation techniques such as beamforming or joint transmission. In some examples, inter-station communications manager 1150 may provide an X2 interface within an LTE/LTE-A wireless communication network technology to provide communication between base stations 105.

Figure 12:
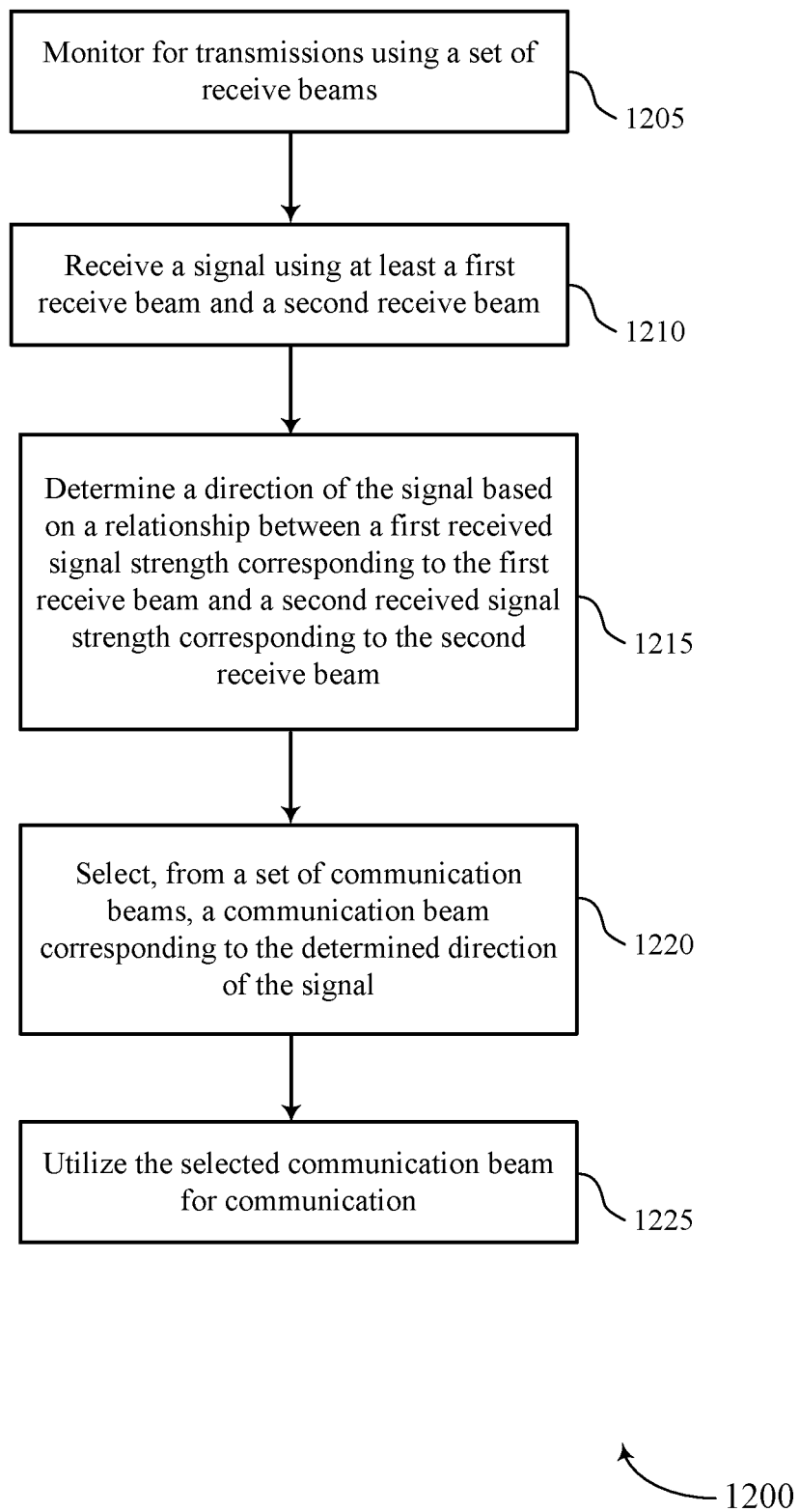
FIGS. 12 through 16 illustrate methods for determining signal direction and interference using multiple receive beams in accordance with aspects of the present disclosure.

FIG. 12 shows a flowchart illustrating a method 1200 for determining signal direction and interference using multiple receive beams in accordance with aspects of the present disclosure. The operations of method 1200 may be implemented by a UE 115, a base station 105, or components of one of these devices as described herein. For example, the operations of method 1200 may be performed by a multi-beam reception module as described with reference to FIGS. 7 through 9. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1205 the UE 115 or base station 105 may monitor for transmissions using a number of receive beams. The operations of 1205 may be performed according to the methods described herein. In certain examples, aspects of the operations of 1205 may be performed by a monitoring component as described with reference to FIGS. 7 through 9.

At 1210 the UE 115 or base station 105 may receive a signal using at least a first receive beam of the number of receive beams and a second receive beam of the number of receive beams. The operations of 1210 may be performed according to the methods described herein. In certain examples, aspects of the operations of 1210 may be performed by a reception component as described with reference to FIGS. 7 through 9.

At 1215 the UE 115 or base station 105 may determine a direction of the signal based on a relationship between a first received signal strength corresponding to the first receive beam and a second received signal strength corresponding to the second receive beam. The operations of 1215 may be performed according to the methods described herein. In certain examples, aspects of the operations of 1215 may be performed by a direction determination component as described with reference to FIGS. 7 through 9.

At 1220 the UE 115 or base station 105 may select, from a set of communication beams, a communication beam corresponding to the determined direction of the signal, where the set of communication beams is different from the set of receive beams (e.g., the receive beams used to monitor for transmissions). The operations of 1220 may be performed according to the methods described herein. In certain examples, aspects of the operations of 1220 may be performed by a beam selection component as described with reference to FIGS. 7 through 9.

At 1225 the UE 115 or base station 105 may utilize the selected communication beam for communication. The operations of 1225 may be performed according to the methods described herein. In certain examples, aspects of the operations of 1225 may be performed by a beam utilization component as described with reference to FIGS. 7 through 9.

Figure 13:
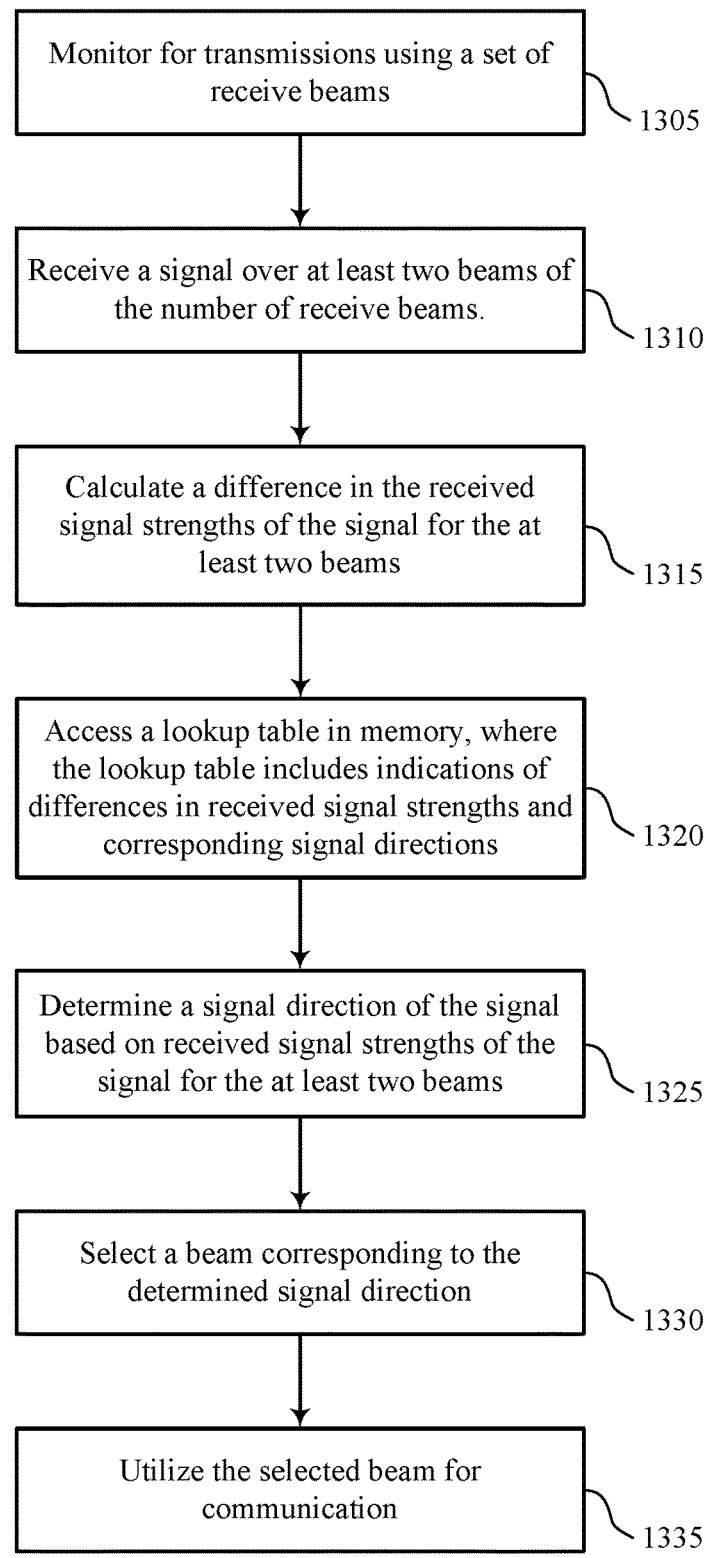

FIG. 13 shows a flowchart illustrating a method 1300 for determining signal direction and interference using multiple receive beams in accordance with aspects of the present disclosure. The operations of method 1300 may be implemented by a UE 115, a base station 105, or components of one of these devices as described herein. For example, the operations of method 1300 may be performed by a multi-beam reception module as described with reference to FIGS. 7 through 9. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1305 the UE 115 or base station 105 may monitor for transmissions using a number of receive beams. The operations of 1305 may be performed according to the methods described herein. In certain examples, aspects of the operations of 1305 may be performed by a monitoring component as described with reference to FIGS. 7 through 9.

At 1310 the UE 115 or base station 105 may receive a signal over at least two beams of the number of receive beams. The operations of 1310 may be performed according to the methods described herein. In certain examples, aspects of the operations of 1310 may be performed by a reception component as described with reference to FIGS. 7 through 9.

At 1315 the UE 115 or base station 105 may calculate a difference in the received signal strengths of the signal for the at least two beams, where the signal direction is determined based on the difference in the received signal strengths. The operations of 1315 may be performed according to the methods described herein. In certain examples, aspects of the operations of 1315 may be performed by a signal strength component as described with reference to FIGS. 7 through 9.

At 1320 the UE 115 or base station 105 may access a lookup table in memory, where the lookup table includes indications of differences in received signal strengths and corresponding signal directions. The operations of 1320 may be performed according to the methods described herein. In certain examples, aspects of the operations of 1320 may be performed by a signal strength component as described with reference to FIGS. 7 through 9.

At 1325 the UE 115 or base station 105 may determine a signal direction of the signal based on received signal strengths of the signal for the at least two beams. The operations of 1325 may be performed according to the methods described herein. In certain examples, aspects of the operations of 1325 may be performed by a direction determination component as described with reference to FIGS. 7 through 9.

At 1330 the UE 115 or base station 105 may select a beam corresponding to the determined signal direction. The operations of 1330 may be performed according to the methods described herein. In certain examples, aspects of the operations of 1330 may be performed by a beam selection component as described with reference to FIGS. 7 through 9.

At 1335 the UE 115 or base station 105 may utilize the selected beam for communication. The operations of 1335 may be performed according to the methods described herein. In certain examples, aspects of the operations of 1335 may be performed by a beam utilization component as described with reference to FIGS. 7 through 9.

Figure 14:
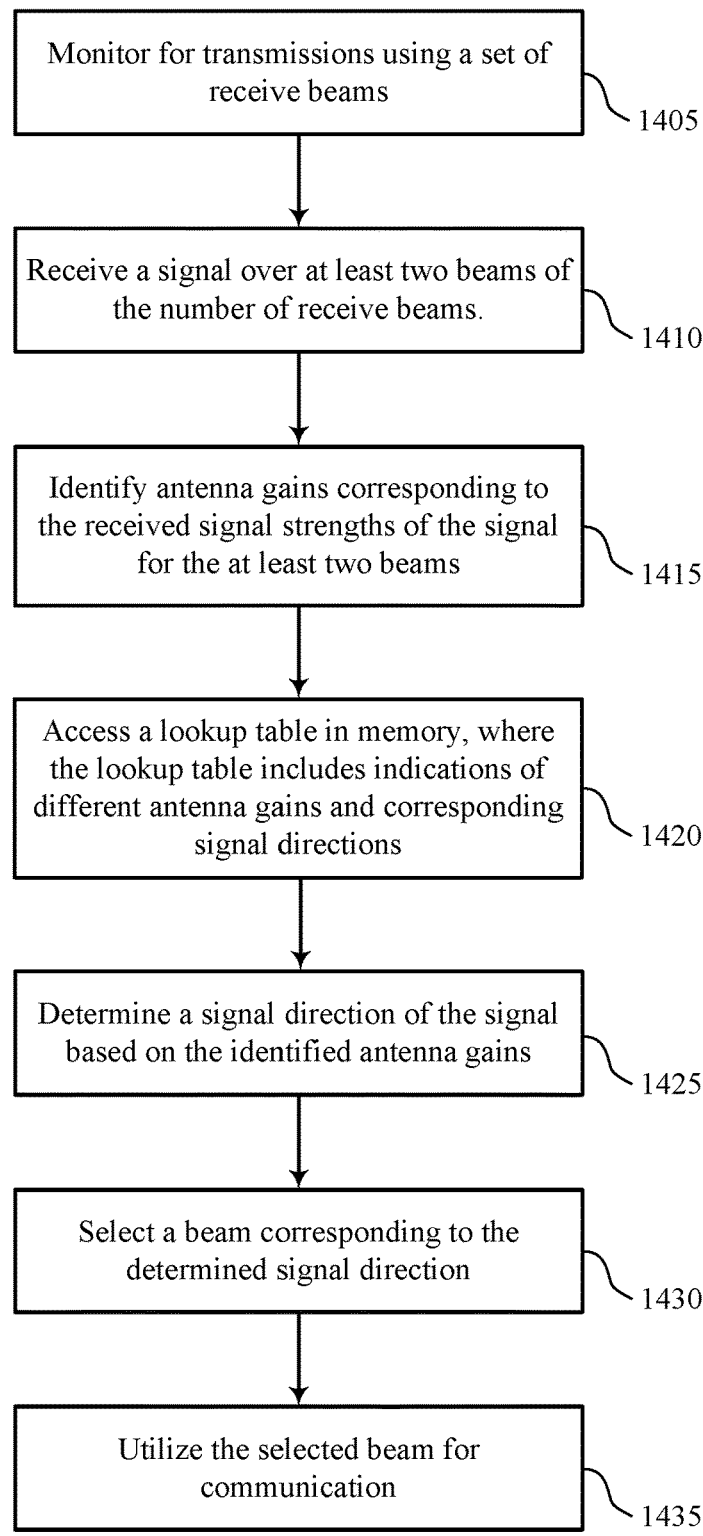

FIG. 14 shows a flowchart illustrating a method 1400 for determining signal direction and interference using multiple receive beams in accordance with aspects of the present disclosure. The operations of method 1400 may be implemented by a UE 115, a base station 105, or components of one of these devices as described herein. For example, the operations of method 1400 may be performed by a multi-beam reception module as described with reference to FIGS. 7 through 9. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware.

At 1405 the UE 115 or base station 105 may monitor for transmissions using a number of receive beams. The operations of 1405 may be performed according to the methods described herein. In certain examples, aspects of the operations of 1405 may be performed by a monitoring component as described with reference to FIGS. 7 through 9.

At 1410 the UE 115 or base station 105 may receive a signal over at least two beams of the number of receive beams. The operations of 1410 may be performed according to the methods described herein. In certain examples, aspects of the operations of 1410 may be performed by a reception component as described with reference to FIGS. 7 through 9.

At 1415 the UE 115 or base station 105 may identify antenna gains corresponding to the received signal strengths of the signal for the at least two beams, where the signal direction is determined based on the identified antenna gains. The operations of 1415 may be performed according to the methods described herein. In certain examples, aspects of the operations of 1415 may be performed by an antenna gain component as described with reference to FIGS. 7 through 9.

At 1420 the UE 115 or base station 105 may access a lookup table in memory, where the lookup table contains indications of different antenna gains and corresponding signal directions. The operations of 1420 may be performed according to the methods described herein. In certain examples, aspects of the operations of 1420 may be performed by an antenna gain component as described with reference to FIGS. 7 through 9.

At 1425 the UE 115 or base station 105 may determine a signal direction of the signal based on received signal strengths of the signal for the at least two beams and the identified antenna gains. The operations of 1425 may be performed according to the methods described herein. In certain examples, aspects of the operations of 1425 may be performed by a direction determination component as described with reference to FIGS. 7 through 9.

At 1430 the UE 115 or base station 105 may select a beam corresponding to the determined signal direction. The operations of 1430 may be performed according to the methods described herein. In certain examples, aspects of the operations of 1430 may be performed by a beam selection component as described with reference to FIGS. 7 through 9.

At 1435 the UE 115 or base station 105 may utilize the selected beam for communication. The operations of 1435 may be performed according to the methods described herein. In certain examples, aspects of the operations of 1435 may be performed by a beam utilization component as described with reference to FIGS. 7 through 9.

Figure 15:
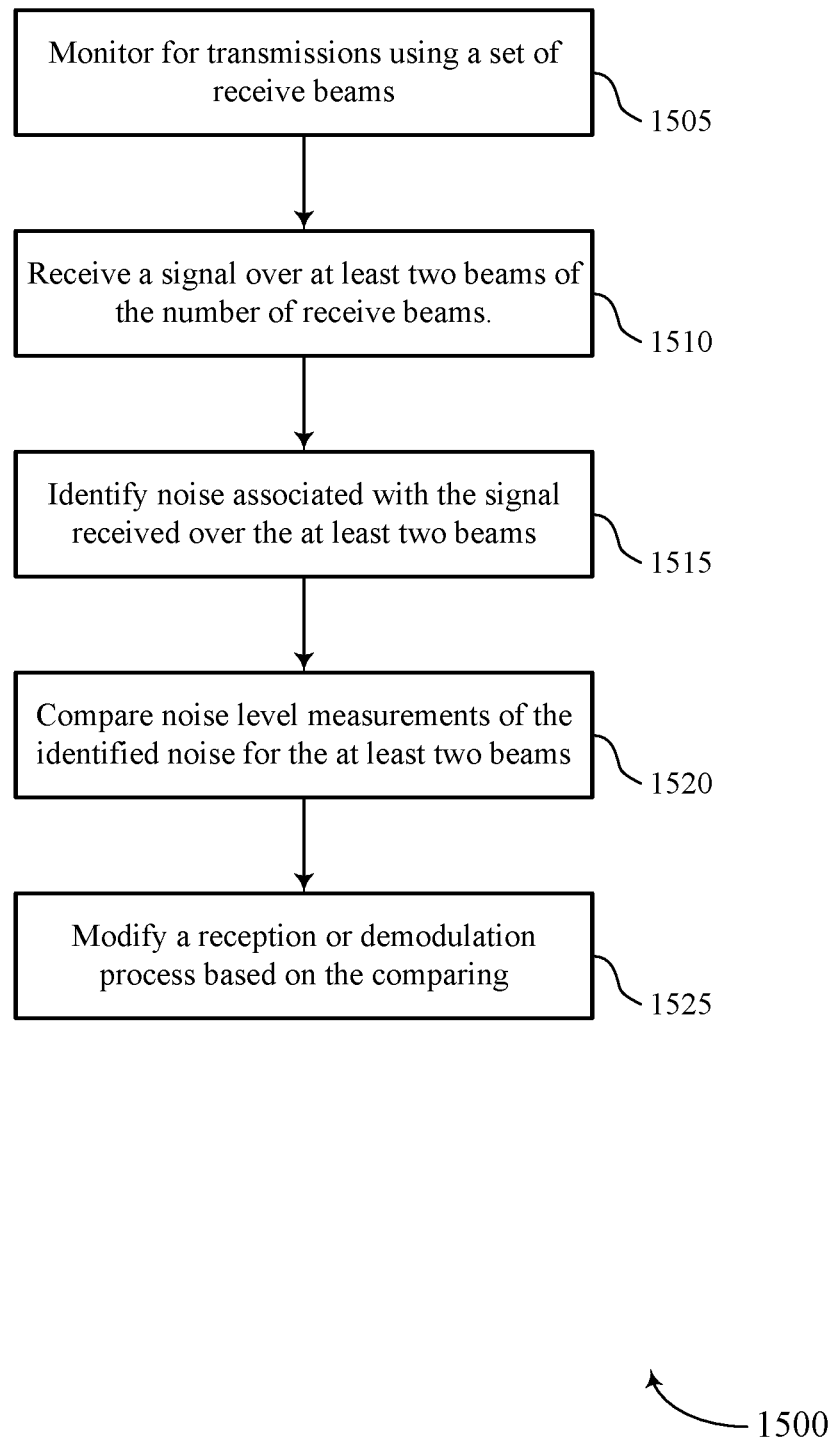

FIG. 15 shows a flowchart illustrating a method 1500 for determining signal direction and interference using multiple receive beams in accordance with aspects of the present disclosure. The operations of method 1500 may be implemented by a UE 115, a base station 105, or components of one of these devices as described herein. For example, the operations of method 1500 may be performed by a multi-beam reception module as described with reference to FIGS. 7 through 9. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware. In some cases, the UE 115 or base station 105 may perform the operations of method 1500 in conjunction with the operations of method 1200.

At 1505 the UE 115 or base station 105 may monitor for transmissions using a number of receive beams. The operations of 1505 may be performed according to the methods described herein. In certain examples, aspects of the operations of 1505 may be performed by a monitoring component as described with reference to FIGS. 7 through 9.

At 1510 the UE 115 or base station 105 may receive a signal over at least two beams of the number of receive beams. The operations of 1510 may be performed according to the methods described herein. In certain examples, aspects of the operations of 1510 may be performed by a reception component as described with reference to FIGS. 7 through 9.

At 1515 the UE 115 or base station 105 may identify noise associated with the signal received over the at least two beams. The operations of 1515 may be performed according to the methods described herein. In certain examples, aspects of the operations of 1515 may be performed by a noise identifier as described with reference to FIGS. 7 through 9.

At 1520 the UE 115 or base station 105 may compare noise level measurements of the identified noise for the at least two beams. The operations of 1520 may be performed according to the methods described herein. In certain examples, aspects of the operations of 1520 may be performed by a noise level comparison component as described with reference to FIGS. 7 through 9.

At 1525 the UE 115 or base station 105 may modify a reception or demodulation process based on the comparing. The operations of 1525 may be performed according to the methods described herein. In certain examples, aspects of the operations of 1525 may be performed by a modification component as described with reference to FIGS. 7 through 9.

Figure 16:
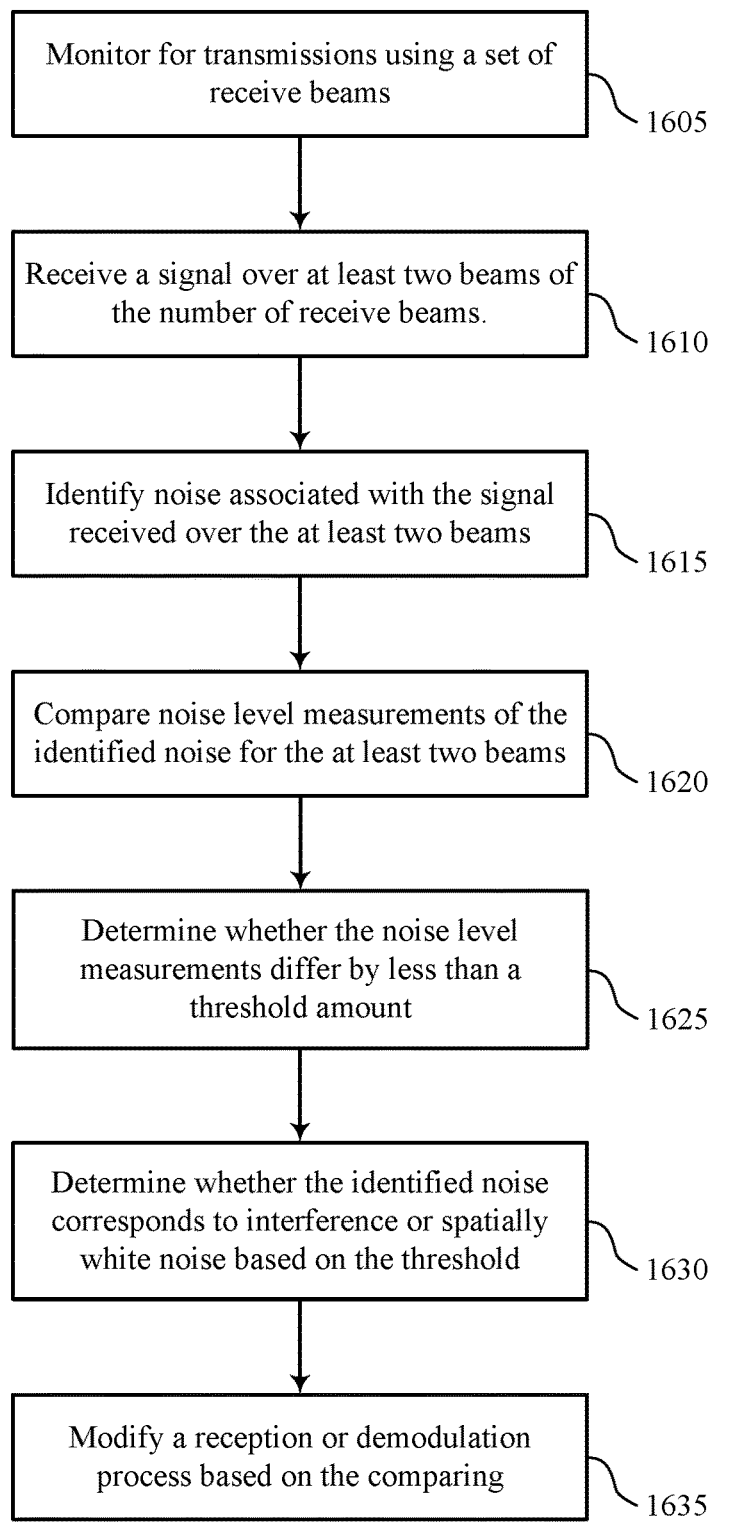

FIG. 16 shows a flowchart illustrating a method 1600 for determining signal direction and interference using multiple receive beams in accordance with aspects of the present disclosure. The operations of method 1600 may be implemented by a UE 115, a base station 105, or components of one of these devices as described herein. For example, the operations of method 1600 may be performed by a multi-beam reception module as described with reference to FIGS. 7 through 9. In some examples, a UE 115 or base station 105 may execute a set of codes to control the functional elements of the device to perform the functions described herein. Additionally or alternatively, the UE 115 or base station 105 may perform aspects of the functions described herein using special-purpose hardware. In some cases, the UE 115 or base station 105 may perform the operations of method 1500 in conjunction with the operations of method 1200.

At 1605 the UE 115 or base station 105 may monitor for transmissions using a number of receive beams. The operations of 1605 may be performed according to the methods described herein. In certain examples, aspects of the operations of 1605 may be performed by a monitoring component as described with reference to FIGS. 7 through 9.

At 1610 the UE 115 or base station 105 may receive a signal over at least two beams of the number of receive beams. The operations of 1610 may be performed according to the methods described herein. In certain examples, aspects of the operations of 1610 may be performed by a reception component as described with reference to FIGS. 7 through 9.

At 1615 the UE 115 or base station 105 may identify noise associated with the signal received over the at least two beams. The operations of 1615 may be performed according to the methods described herein. In certain examples, aspects of the operations of 1615 may be performed by a noise identifier as described with reference to FIGS. 7 through 9.

At 1620 the UE 115 or base station 105 may compare noise level measurements of the identified noise for the at least two beams. The operations of 1620 may be performed according to the methods described herein. In certain examples, aspects of the operations of 1620 may be performed by a noise level comparison component as described with reference to FIGS. 7 through 9.

At 1625 the UE 115 or base station 105 may determine whether the noise level measurements differ by less than a threshold amount. The operations of 1625 may be performed according to the methods described herein. In certain examples, aspects of the operations of 1625 may be performed by a noise threshold component as described with reference to FIGS. 7 through 9.

At 1630 the UE 115 or base station 105 may determine whether the identified noise corresponds to interference or spatially white noise (e.g., based on the noise threshold), where modifying the reception or demodulation process is further based on the determining. The operations of 1630 may be performed according to the methods described herein. In certain examples, aspects of the operations of 1630 may be performed by a noise determination component as described with reference to FIGS. 7 through 9.

At 1635 the UE 115 or base station 105 may modify the reception or demodulation process based on the comparing. The operations of 1635 may be performed according to the methods described herein. In certain examples, aspects of the operations of 1635 may be performed by a modification component as described with reference to FIGS. 7 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB.

An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the herein description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   monitoring for transmissions using a plurality of receive beams;
   receiving a signal using at least a first receive beam of the plurality of receive beams and a second receive beam of the plurality of receive beams;
   calculating a difference between a first received signal strength for the signal corresponding to the first receive beam and a second received signal strength for the signal corresponding to the second receive beam;

determining a direction of the signal based at least in part on the calculated difference between the first received signal strength and the second received signal strength, wherein the determined direction of the signal is different from both a first beam direction corresponding to the first receive beam and a second beam direction corresponding to the second receive beam;

selecting, from a set of communication beams, a communication beam corresponding to the determined direction of the signal, wherein the set of communication beams is different from the plurality of receive beams used to monitor for transmissions; and utilizing the selected communication beam for communication.

2. The method of claim 1, wherein determining the direction of the signal comprises:
accessing a lookup table in memory, wherein the lookup table comprises indications of differences in received signal strengths and corresponding signal directions.

3. The method of claim 1, wherein determining the direction of the signal comprises:
inputting the difference between the first received signal strength and the second received signal strength into a function; and
obtaining the direction of the signal as an output of the function.

4. The method of claim 1, further comprising:
identifying a first antenna gain corresponding to the first received signal strength for the signal corresponding to the first receive beam and a second antenna gain corresponding to the second received signal strength for the signal corresponding to the second receive beam, wherein the direction of the signal is determined based at least in part on the identified first antenna gain and the identified second antenna gain.

5. The method of claim 4, wherein determining the direction of the signal comprises:
accessing one or more lookup tables in memory, wherein the one or more lookup tables comprise indications of different antenna gains and corresponding signal directions.

6. The method of claim 4, wherein determining the direction of the signal comprises:
inputting the identified first antenna gain and the identified second antenna gain into a function; and
obtaining the direction of the signal as an output of the function.

7. The method of claim 4, further comprising:
estimating an antenna gain for at least one communication beam of the set of communication beams different from each of the plurality of receive beams based at least in part on the determined direction of the signal.

8. The method of claim 1, further comprising:
determining an estimated received signal strength for the selected communication beam corresponding to the determined direction of the signal.

9. The method of claim 1, further comprising:
receiving, in different directions, one or more additional signals over one or more receive beams of the plurality of receive beams; and
estimating additional received signal strengths for the one or more additional signals received in the different directions, wherein selecting the communication beam is further based at least in part on the estimated additional received signal strengths.

10. The method of claim 1, further comprising:
identifying noise associated with the signal; and
comparing a first noise level of the identified noise for the first receive beam to a second noise level of the identified noise for the second receive beam, wherein selecting the communication beam is further based at least in part on the comparing.

11. The method of claim 10, further comprising:
modifying a reception or demodulation process based at least in part on the comparing, wherein the communication further utilizes the modified reception or demodulation process.

12. The method of claim 11, further comprising:
determining whether the identified noise corresponds to interference or spatially white noise, wherein modifying the reception or demodulation process is further based at least in part on the determining whether the identified noise corresponds to interference or spatially white noise.

13. The method of claim 11, wherein modifying the reception or demodulation process comprises:
mapping a first signal quality from the first receive beam to a first demodulation metric and a second signal quality from the second receive beam to a second demodulation metric based at least in part on the comparing.

14. The method of claim 10, further comprising:
detecting an interference source based at least in part on the comparing; and
determining a direction of the interference source based at least in part on the first noise level of the identified noise, the second noise level of the identified noise, or a combination thereof.

15. The method of claim 14, wherein the communication beam is further selected based at least in part on the determined direction of the interference source.

16. The method of claim 1, wherein the plurality of receive beams comprises a subset of the set of communication beams.

17. The method of claim 16, wherein the selected communication beam is different from each of the plurality of receive beams.

18. The method of claim 1, wherein selecting the communication beam further comprises:
determining an index of the selected communication beam, a beam direction of the selected communication beam, a width of the selected communication beam, one or more antenna elements for the selected communication beam, or a combination thereof.

19. The method of claim 1, wherein the communication beam is further selected based at least in part on maximizing an estimated antenna gain for the selected communication beam.

20. The method of claim 1, wherein at least one of the plurality of receive beams is wider than the selected communication beam.

21. An apparatus for wireless communications, comprising:
a processor;
memory coupled with the processor; and
instructions stored in the memory, when executed by the processor, to cause the apparatus to:
monitor for transmissions using a plurality of receive beams;
receive a signal using at least a first receive beam of the plurality of receive beams and a second receive beam of the plurality of receive beams;

calculate a difference between a first received signal strength for the signal corresponding to the first receive beam and a second received signal strength for the signal corresponding to the second receive beam;

determine a direction of the signal based at least in part on the calculated difference between the first received signal strength and the second received signal strength, wherein the determined direction of the signal is different from both a first beam direction corresponding to the first receive beam and a second beam direction corresponding to the second receive beam;

select, from a set of communication beams, a communication beam corresponding to the determined direction of the signal, wherein the set of communication beams is different from the plurality of receive beams used to monitor for transmissions; and utilize the selected communication beam for communication.

22. The apparatus of claim 21, wherein the instructions to determine the direction of the signal are executable by the processor to cause the apparatus to:

access a lookup table in memory, wherein the lookup table comprises indications of differences in received signal strengths and corresponding signal directions.

23. The apparatus of claim 21, wherein the instructions to determine the direction of the signal are executable by the processor to cause the apparatus to:

input the difference between the first received signal strength and the second received signal strength into a function; and obtain the direction of the signal as an output of the function.

24. The apparatus of claim 21, wherein the instructions are further executable by the processor to cause the apparatus to:

identify a first antenna gain corresponding to the first received signal strength for the signal corresponding to the first receive beam and a second antenna gain corresponding to the second received signal strength for the signal corresponding to the second receive beam, wherein the instructions to determine the direction of the signal comprise instructions to determine the direction of the signal based at least in part on the identified first antenna gain and the identified second antenna gain.

25. The apparatus of claim 24, wherein the instructions to determine the direction of the signal are executable by the processor to cause the apparatus to:

access one or more lookup tables in memory, wherein the one or more lookup tables comprise indications of different antenna gains and corresponding signal directions.

26. The apparatus of claim 24, wherein the instructions to determine the direction of the signal are executable by the processor to cause the apparatus to:

input the identified first antenna gain and the identified second antenna gain into a function; and obtain the direction of the signal as an output of the function.

27. An apparatus for wireless communications, comprising:

means for monitoring for transmissions using a plurality of receive beams;

means for receiving a signal using at least a first receive beam of the plurality of receive beams and a second receive beam of the plurality of receive beams;

means for calculating a difference between a first received signal strength for the signal corresponding to the first receive beam and a second received signal strength for the signal corresponding to the second receive beam;

means for determining a direction of the signal based at least in part on the calculated difference between the first received signal strength and the second received signal strength, wherein the determined direction of the signal is different from both a first beam direction corresponding to the first receive beam and a second beam direction corresponding to the second receive beam;

means for selecting, from a set of communication beams, a communication beam corresponding to the determined direction of the signal, wherein the set of communication beams is different from the plurality of receive beams used to monitor for transmissions; and means for utilizing the selected communication beam for communication.

28. A non-transitory computer-readable medium storing code for wireless communications, the code comprising instructions executable by a processor to:

monitor for transmissions using a plurality of receive beams;

receive a signal using at least a first receive beam of the plurality of receive beams and a second receive beam of the plurality of receive beams;

calculate a difference between a first received signal strength for the signal corresponding to the first receive beam and a second received signal strength for the signal corresponding to the second receive beam;

determine a direction of the signal based at least in part on the calculated difference between the first received signal strength and the second received signal strength, wherein the determined direction of the signal is different from both a first beam direction corresponding to the first receive beam and a second beam direction corresponding to the second receive beam;

select, from a set of communication beams, a communication beam corresponding to the determined direction of the signal, wherein the set of communication beams is different from the plurality of receive beams used to monitor for transmissions; and utilize the selected communication beam for communication.

* * * * *